US 12,218,420 B2

(12) United States Patent
Kim et al.

(10) Patent No.: US 12,218,420 B2
(45) Date of Patent: Feb. 4, 2025

(54) ELECTRONIC DEVICE INCLUDING ANTENNA

(71) Applicant: SAMSUNG ELECTRONICS CO., LTD., Suwon-si (KR)

(72) Inventors: Byungjoon Kim, Suwon-si (KR); Kyunghoon Moon, Suwon-si (KR); Heejin Park, Suwon-si (KR); Yongyoun Kim, Suwon-si (KR); Youngmi Jang, Suwon-si (KR); Eunseong Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 85 days.

(21) Appl. No.: 17/987,343

(22) Filed: Nov. 15, 2022

(65) Prior Publication Data

US 2023/0136210 A1 May 4, 2023

Related U.S. Application Data

(63) Continuation of application No. PCT/KR2022/015834, filed on Oct. 18, 2022.

(30) Foreign Application Priority Data

Nov. 1, 2021 (KR) .................. 10-2021-0148240

(51) Int. Cl.
*H01Q 1/52* (2006.01)
*H01Q 1/24* (2006.01)
(Continued)

(52) U.S. Cl.
CPC ............ *H01Q 1/521* (2013.01); *H01Q 1/243* (2013.01); *H01Q 9/0407* (2013.01); *H01Q 21/24* (2013.01)

(58) Field of Classification Search
CPC ...... H01Q 1/521; H01Q 1/243; H01Q 9/0407; H01Q 21/24; H01Q 1/24; H01Q 1/32;
(Continued)

(56) References Cited

U.S. PATENT DOCUMENTS 6,975,273 B1 * 12/2005 Choi ..................... H01Q 1/243
343/702
8,907,859 B2 12/2014 Hsu et al.
(Continued)

FOREIGN PATENT DOCUMENTS

CN 111697315 A 9/2020
KR 10-2006-0121607 A 11/2006
(Continued)

OTHER PUBLICATIONS

International Search Report (PCT/ISA/210) issued by the International Searching Authority on Jan. 18, 2023 in International Application No. PCT/KR2022/015834.
(Continued)

*Primary Examiner* — Wei (Victor) Y Chan
(74) *Attorney, Agent, or Firm* — Sughrue Mion, PLLC

(57) ABSTRACT

An electronic device is provided. The electronic device includes: a first housing comprising a first support member facing in a first direction, a first rear cover facing in a second direction opposite the first direction, and a first side member surrounding a first space between the first support member and the first rear cover; a second housing; a hinge structure connected to the first housing and the second housing and configured to be folded about a folding axis; a first antenna structure disposed in the first space and configured to form a first electric field in the second direction; a second antenna structure disposed near the first antenna structure in the first space; and a conductive member disposed between the first antenna structure and the second antenna structure.

20 Claims, 19 Drawing Sheets

(51) Int. Cl.
*H01Q 3/34* (2006.01)
*H01Q 5/335* (2015.01)
*H01Q 9/04* (2006.01)
*H01Q 21/24* (2006.01)

(58) Field of Classification Search
CPC .......... H01Q 1/38; H01Q 21/06; H01Q 21/28; H01Q 9/04; H01Q 9/02
See application file for complete search history.

(56) References Cited

U.S. PATENT DOCUMENTS

| | | |
|---|---|---|
| 9,608,683 B2 | 3/2017 | Kawasaki |
| 10,432,031 B2 | 10/2019 | Peralta et al. |
| 10,741,932 B2 | 8/2020 | Thai et al. |
| 11,233,323 B2 | 1/2022 | Kim et al. |
| 2006/0063495 A1 | 3/2006 | Hamilton |
| 2010/0090914 A1 | 4/2010 | Watanabe |
| 2014/0118215 A1 | 5/2014 | Hsu |
| 2018/0095502 A1* | 4/2018 | Yamazaki ............ H10K 59/121 |
| 2019/0372216 A1 | 12/2019 | Lee et al. |
| 2020/0186629 A1* | 6/2020 | He ................... H04B 7/0404 |
| 2021/0028528 A1 | 1/2021 | Alexanian et al. |
| 2021/0057812 A1 | 2/2021 | Yun et al. |
| 2021/0143551 A1* | 5/2021 | Zekios ................... H01Q 1/08 |
| 2022/0166132 A1 | 5/2022 | Chu et al. |
| 2022/0393705 A1 | 12/2022 | Lee et al. |
| 2022/0399634 A1 | 12/2022 | Woo et al. |
| 2023/0066184 A1 | 3/2023 | Kim |

FOREIGN PATENT DOCUMENTS

| | | |
|---|---|---|
| KR | 10-2012-0105681 A | 9/2012 |
| KR | 10-1903787 B1 | 10/2018 |
| KR | 10-2020-0089926 A | 7/2020 |
| KR | 10-2020-0121199 A | 10/2020 |
| KR | 10-2021-0111050 A | 9/2021 |
| WO | 2021/085666 A1 | 5/2021 |
| WO | 2021/095934 A1 | 5/2021 |
| WO | 2021/145463 A1 | 7/2021 |

OTHER PUBLICATIONS

Written Opinion (PCT/ISA/237) issued by the International Searching Authority on Jan. 18, 2023 in International Application No. PCT/KR2022/015834.
Communication issued on Nov. 12, 2024 by European Patent Office in European Patent Application No. 22 88 7462.

* cited by examiner (1210)

(1250)

ELECTRONIC DEVICE INCLUDING ANTENNA

CROSS-REFERENCE TO RELATED APPLICATION(S)

This application is a bypass continuation application of International Application No. PCT/KR2022/015834, filed on Oct. 18, 2022, which is based on and claims priority to Korean Patent Application No. 10-2021-0148240, filed on Nov. 1, 2021, in the Korean Intellectual Property Office, the disclosures of which are incorporated by reference herein in their entireties.

BACKGROUND

1. Field

The disclosure relates to an electronic device including an antenna.

2. Description of Relate Art

Next-generation wireless communication technology may transmit and receive wireless signals using a mmWave band (e.g., a frequency band in the range of about 3 GHz to 100 GHz), and an efficient mounting structure and a new antenna structure (e.g., an antenna module) corresponding thereto are being developed in order to increase the gain of the antenna, and address high free-space loss that may be caused due to the frequency characteristics. The antenna structure may include an array antenna in which various numbers of antenna elements (e.g., conductive patches and/or conductive patterns) are disposed at regular intervals. These antenna elements may be disposed inside the electronic device, and may form a beam pattern in any one direction. For example, the antenna structure may be disposed in the inner space of the electronic device and a beam pattern may be formed toward at least a portion of a front surface, a rear surface, and/or a side surface.

Profiles of electronic devices are being gradually reduced, and antenna structures in mmWave bands forming beam patterns in different directions may be disposed adjacent to each other in the inner space of the electronic devices. Because the antenna structures in the mmWave bands are disposed adjacent to each other, near-field interference may occur between the antenna structures, which becomes more significant with the reduced profile.

SUMMARY

Various embodiments of the disclosure provide an electronic device and a method which reduces interference between antenna structures disposed adjacent to each other in the inner space of the electronic device.

In accordance with an aspect of the disclosure, an electronic device includes: a first housing including a first support member facing in a first direction, a first rear cover facing in a second direction opposite the first direction, and a first side member surrounding a first space between the first support member and the first rear cover; a second housing including a second support member facing in the first direction, a second rear cover facing in the second direction, and a second side member surrounding a second space between the second support member and the second rear cover; a hinge structure connected to the first housing and the second housing and configured to be folded about a folding axis; a first antenna structure disposed in the first space, and configured to form a first electric field in the second direction so as to pass through the first rear cover; a second antenna structure disposed near the first antenna structure in the first space, and configured to form a second electric field in a third direction perpendicular to the second direction; and a conductive member disposed between the first antenna structure and the second antenna structure.

According to one or more embodiments, an electronic device may include a conductive member on the inner surface of a rear cover corresponding to the space between the antenna structures, thereby reducing near-field interference between the antenna structures disposed adjacent to each other. As the near-field interference between the antenna structures is reduced by the conductive member, the transmission power of the antenna structures may be reduced, thereby improving the radiation performance of the antenna structures.

BRIEF DESCRIPTION OF THE DRAWINGS

The above and other aspects, features and advantages of certain embodiments of the present disclosure will be more apparent from the following description taken in conjunction with the accompanying drawings, in which.

DETAILED DESCRIPTION

Figure 1:
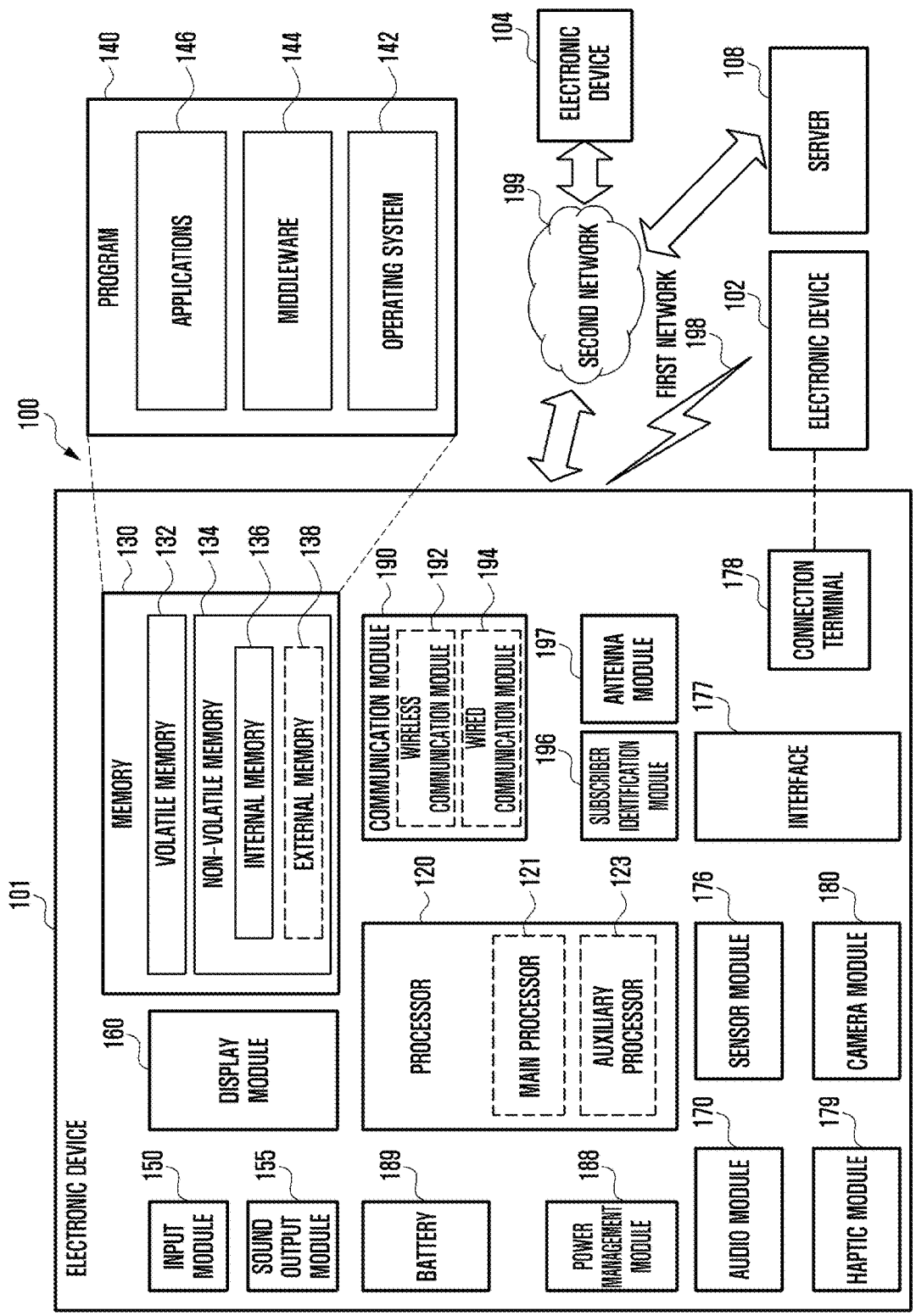
FIG. 1 is a block diagram illustrating an electronic device in a network environment according to various embodiments.

FIG. 1 is a block diagram illustrating an electronic device in a network environment according to various embodiments.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and/or an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) (e.g., speaker or headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., through wires) or wirelessly. According to an embodiment, the interface 177 may include, for example, a high-definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., an application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., an mmwave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., through wires), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
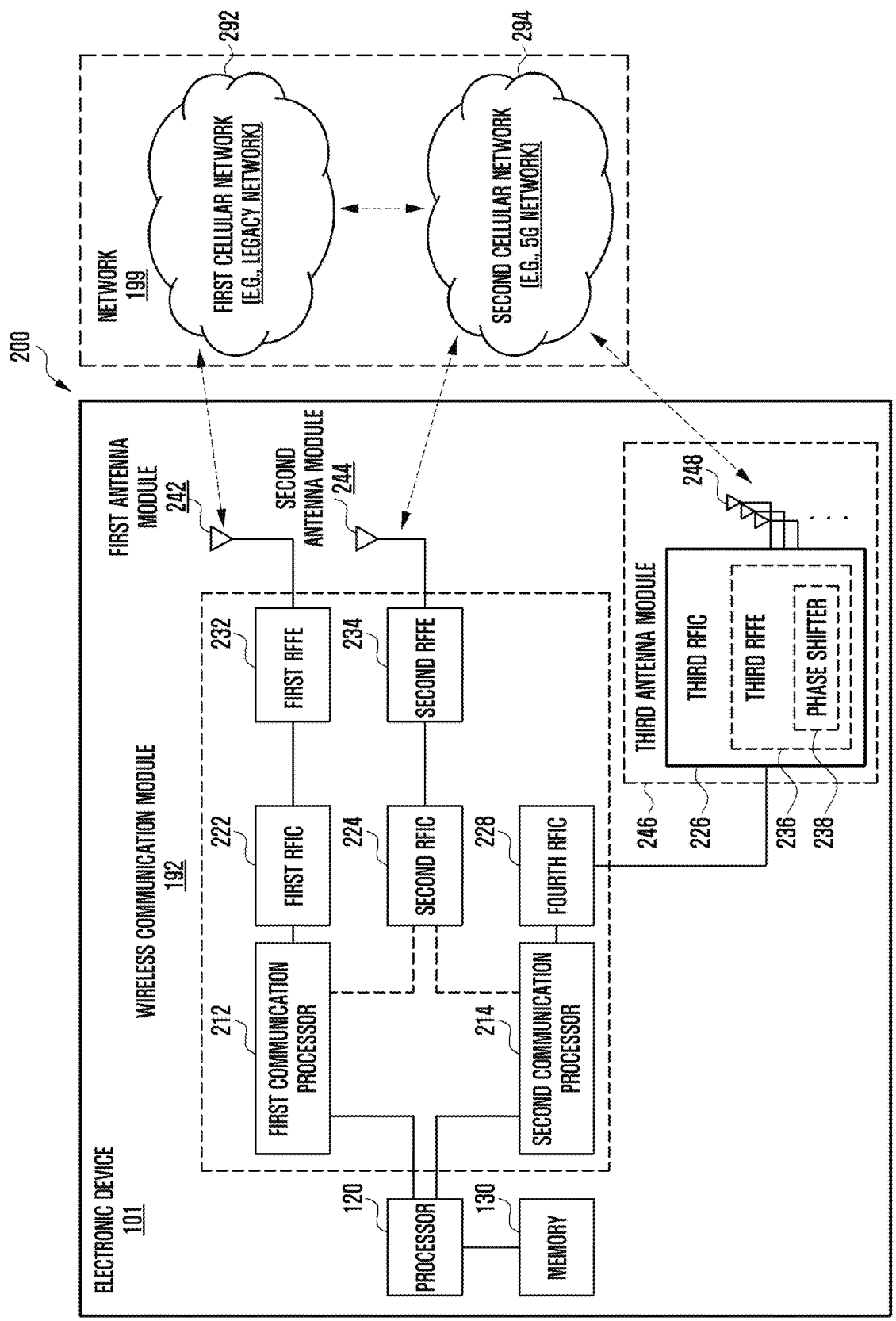
FIG. 2 is a block diagram of an electronic device supporting legacy network communication and 5G network communication according to various embodiments.

FIG. 2 is a block diagram 200 of an electronic device supporting legacy network communication and 5G network communication according to various embodiments.

Referring to FIG. 2, the electronic device 101 may include a first communication processor 212, a second communication processor 214, a first RFIC 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. A second network 199 may include a first cellular network 292 and a second cellular network 294. According to another embodiment, the electronic device 101 may further include at least one of the components described with reference to FIG. 1, and the second network 199 may further include at least one other network. According to one embodiment, the first communication processor 212, the second communication processor 214, the first RFIC 222, the second RFIC 224, the fourth RFIC 228, the first RFFE 232, and the second RFFE 234 may form at least part of the wireless communication module 192. According to another embodiment, the fourth RFIC 228 may be omitted or included as part of the third RFIC 226.

The first communication processor 212 may establish a communication channel of a band to be used for wireless communication with the first cellular network 292 and support legacy network communication through the established communication channel. According to various embodiments, the first cellular network may be a legacy network including a second generation (2G), 3G, 4G, or long term evolution (LTE) network. The second communication processor 214 may establish a communication channel corresponding to a designated band (e.g., about 6 GHz to about 60 GHz) of bands to be used for wireless communication with the second cellular network 294, and support 5G network communication through the established communication channel. According to various embodiments, the second cellular network 294 may be a 5G network defined in 3GPP. Additionally, according to an embodiment, the first communication processor 212 or the second communication processor 214 may establish a communication channel corresponding to another designated band (e.g., about 6 GHz or less) of bands to be used for wireless communication with the second cellular network 294 and support 5G network communication through the established communication channel. According to one embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above 6 RF signal) of a 5G Above 6 band (e.g., about 6 GHz to about 60 GHz) to be used in the second cellular network 294 (e.g., 5G network). Upon reception, a 5G Above 6 RF signal may be obtained from the second cellular network 294 (e.g., 5G network) through an antenna (e.g., the antenna 248) and be preprocessed through the third RFFE 236. The third RFIC 226 may convert the preprocessed 5G Above 6 RF signal to a baseband signal so as to be processed by the second communication processor 214. According to one embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226.

The fourth RFIC 228 may convert an IF signal to a baseband signal so as to be processed by the second communication processor 214.

According to one embodiment, the first RFIC 222 and the second RFIC 224 may be implemented into at least part of a single package or a single chip. According to one embodiment, the first RFFE 232 and the second RFFE 234 may be implemented into at least part of a single package or a single chip. According to one embodiment, at least one of the first antenna module 242 or the second antenna module 244 may be omitted or may be combined with another antenna module to process RF signals of a corresponding plurality of bands.

According to one embodiment, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 294 (e.g., 5G network).

According to one embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above 6 RF signal to be transmitted to the outside (e.g., a base station of a 5G network) of the electronic device 101 through a corresponding antenna element. Upon reception, each of the plurality of phase shifters 238 may convert a phase of the 5G Above 6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-stand alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

Figure 3A:
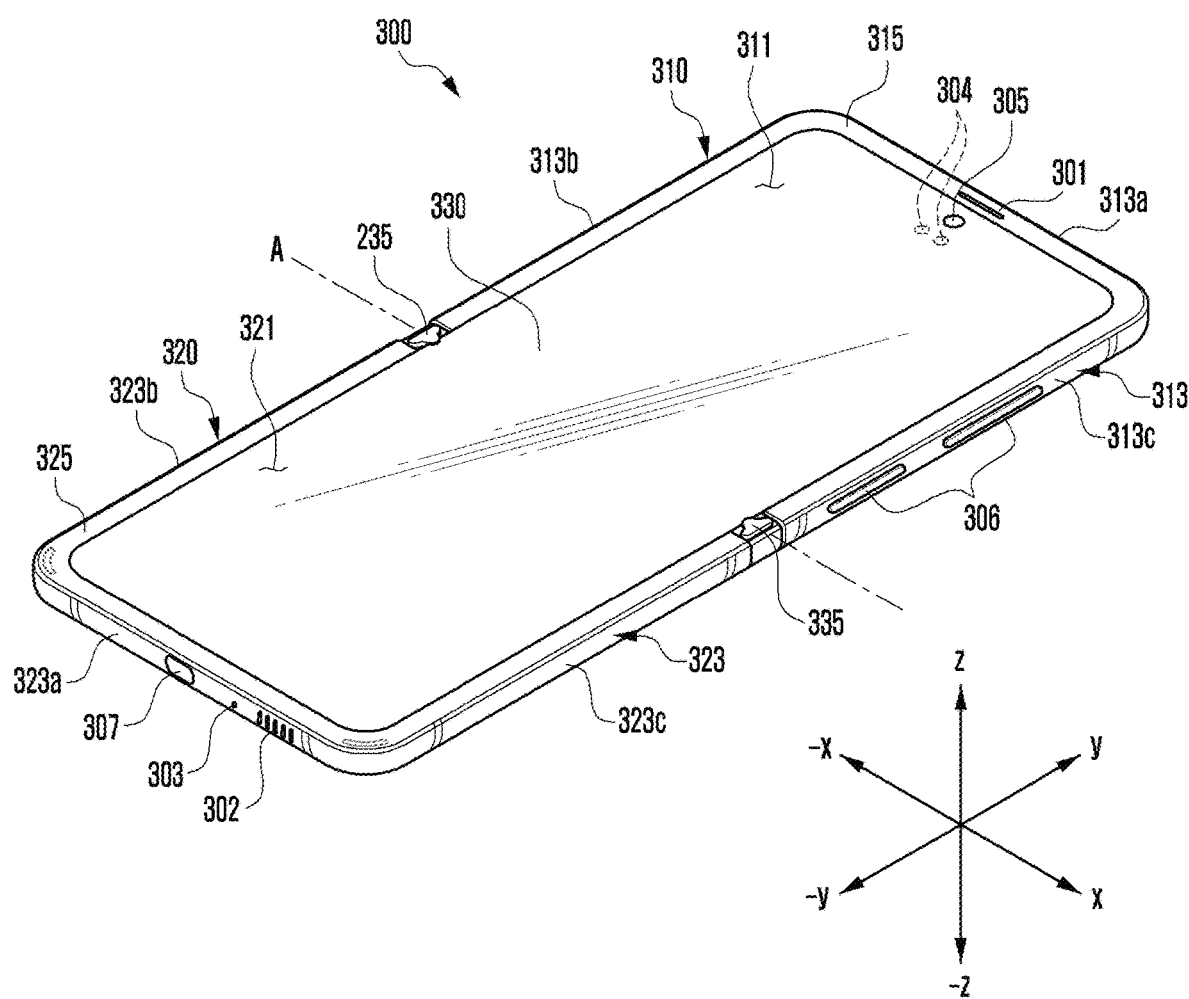
FIG. 3A is a front perspective view of an electronic device in a flat or unfolded state according to various embodiments.
Figure 3B:
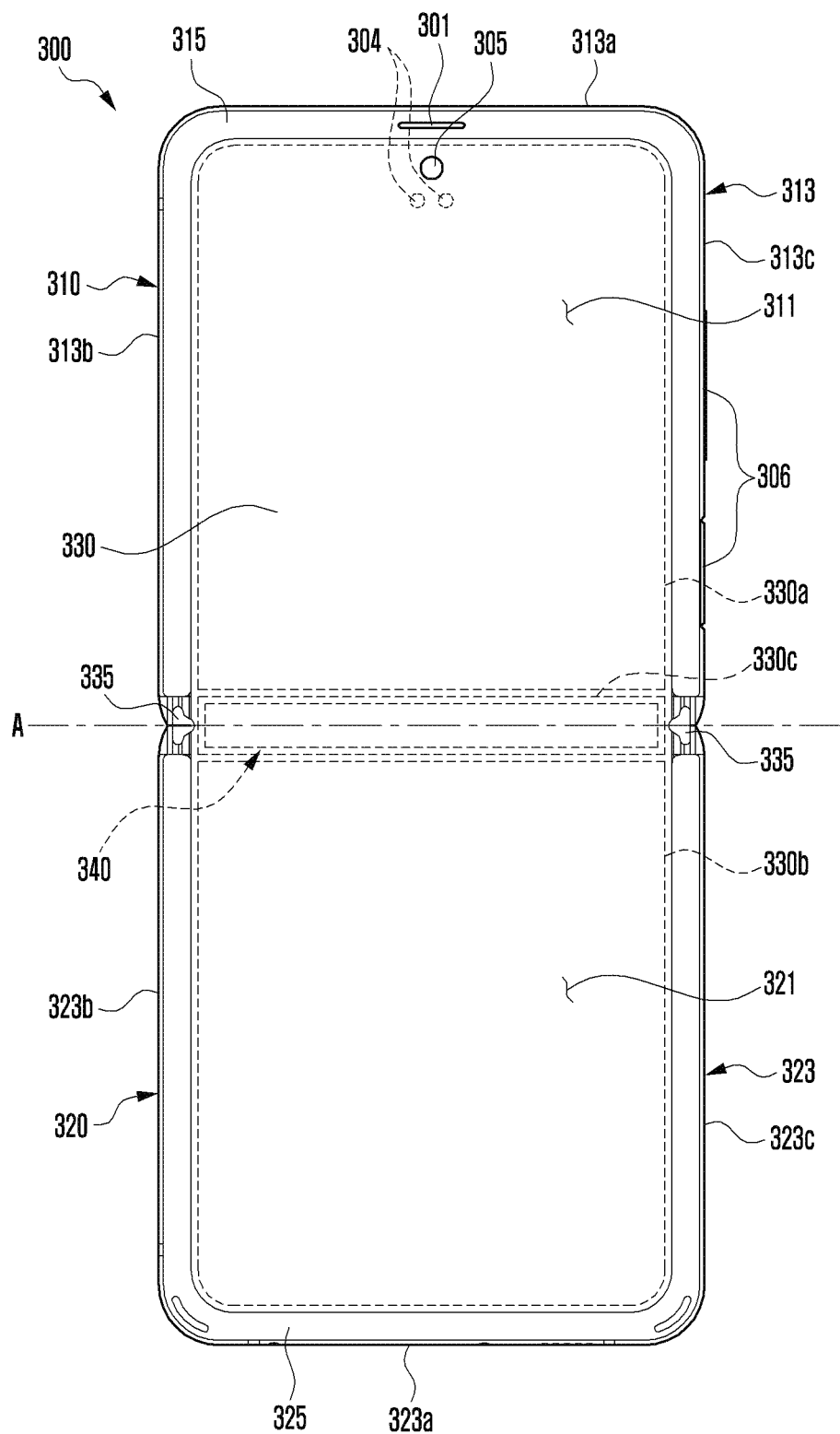
FIG. 3B is a plan view illustrating the front of the electronic device in an unfolded state according to various embodiments.
Figure 3C:
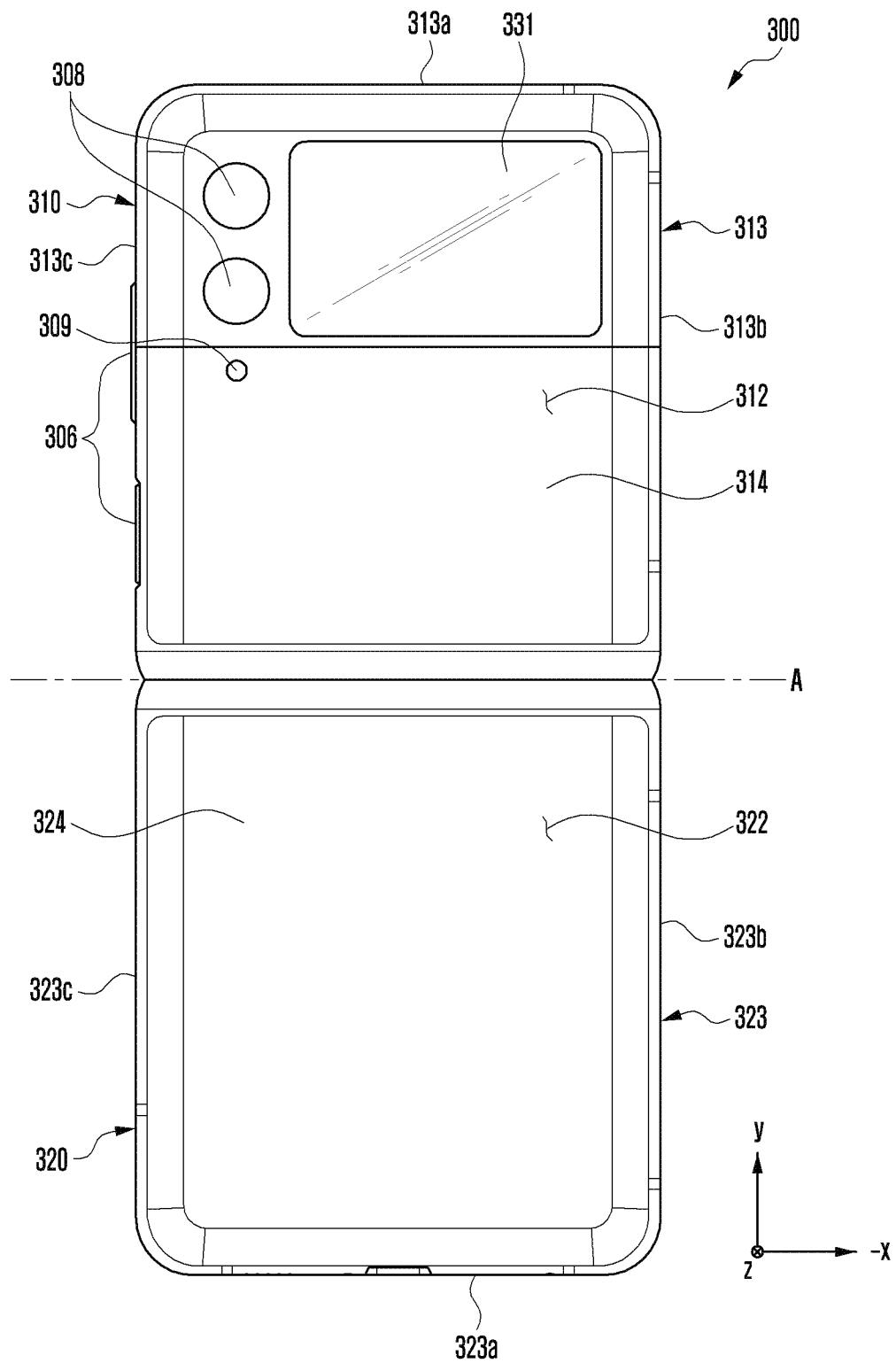
FIG. 3C is a plan view illustrating the back of the electronic device in an unfolded state according to various embodiments.

FIG. 3A is a front perspective view of an electronic device in a flat or unfolded state according to various embodiments. FIG. 3B is a plan view illustrating the front of the electronic device in an unfolded state according to various embodiments. FIG. 3C is a plan view illustrating the back of the electronic device in an unfolded state according to various embodiments.

Figure 4A:
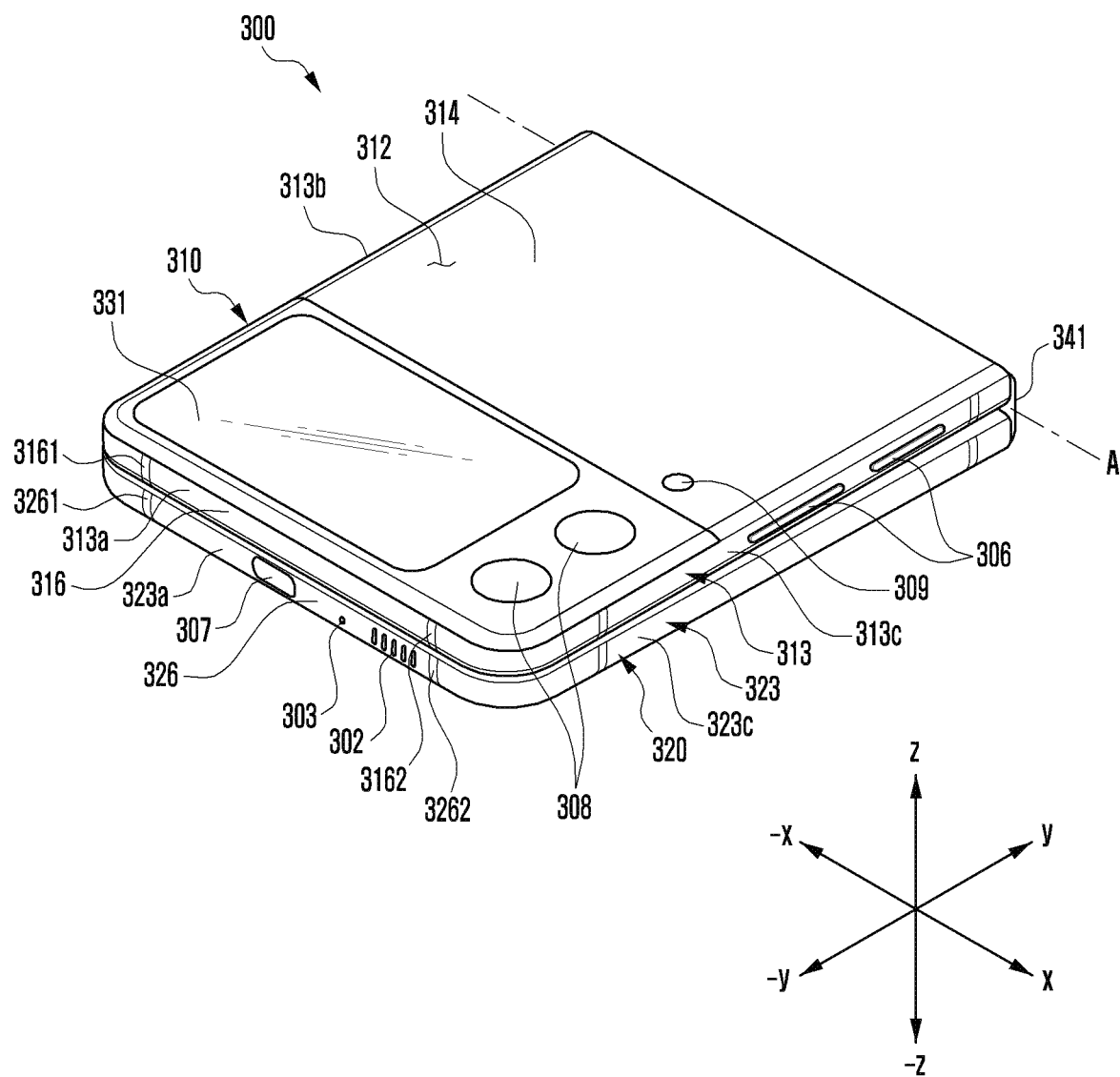
FIG. 4A is a perspective view of the electronic device in a folded state according to various embodiments.
Figure 4B:
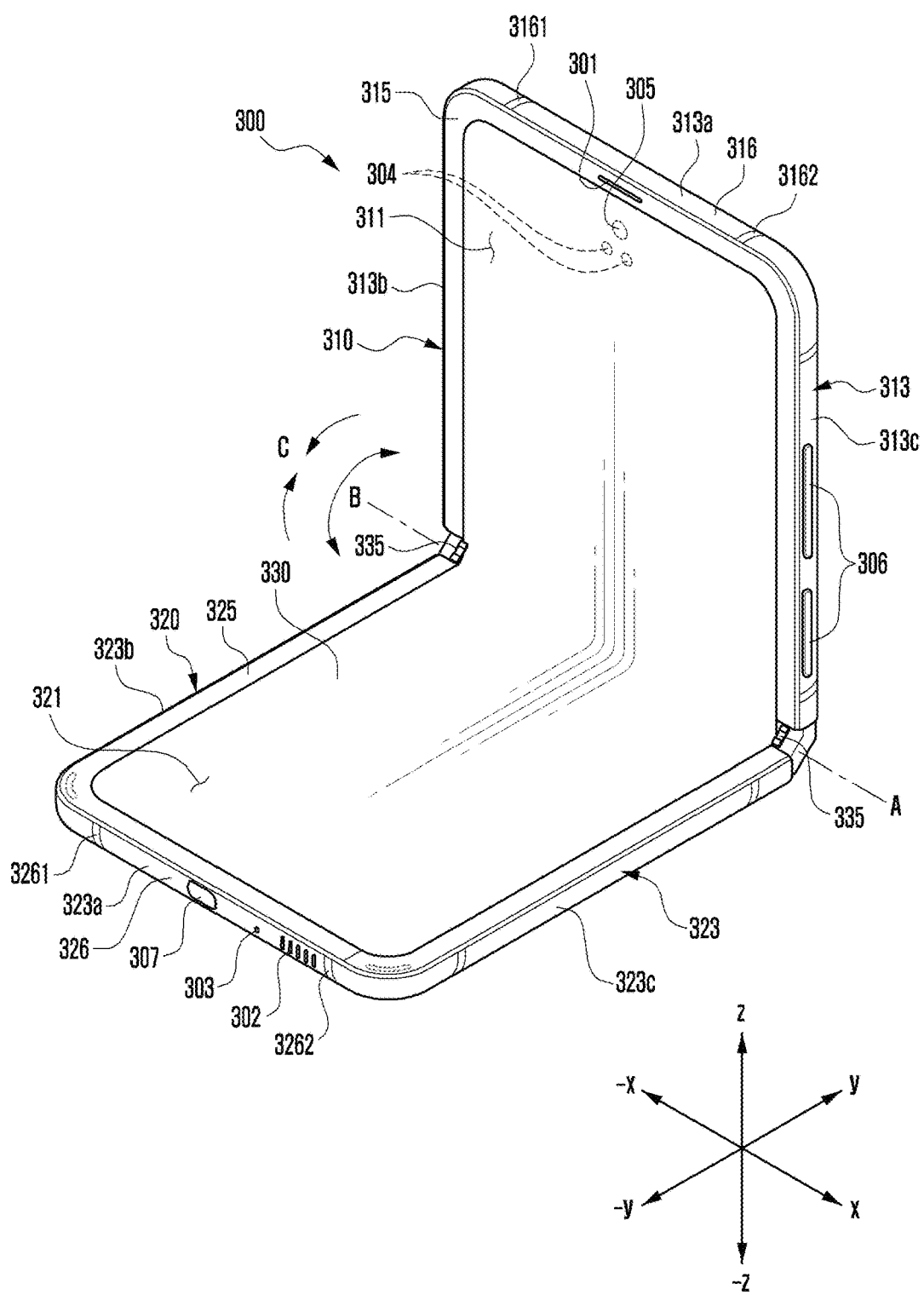
FIG. 4B is a perspective view of the electronic device in an intermediate state according to various embodiments.

FIG. 4A is a perspective view of the electronic device in a folded state according to various embodiments. FIG. 4B is a perspective view of the electronic device in an intermediate state according to various embodiments.

With reference to FIGS. 3A to 4B, the electronic device 300 may include a pair of housings 310 and 320 (e.g., foldable housings) that are rotatably coupled as to allow folding relative to a hinge mechanism (e.g., hinge mechanism 340 in FIG. 3B). In certain embodiments, the hinge mechanism (e.g., hinge mechanism 340 in FIG. 3B) may be disposed along the X-axis direction or the Y-axis direction so that a folding axis corresponds to the X-axis or the Y-axis. In certain embodiments, the electronic device 300 may include two or more hinge mechanisms, which may be arranged to be folded in a same direction or in different directions. According to an embodiment, the electronic device 300 may include a flexible display 330 (e.g., foldable display) disposed in an area formed by the pair of housings 310 and 320. According to an embodiment, the first housing 310 and the second housing 320 may be disposed on both sides of the folding axis (axis A), and may have a substantially symmetrical shape with respect to the folding axis (axis A). According to an embodiment, the angle or distance between the first housing 310 and the second housing 320 may vary, depending on whether the state of the electronic device 300 is a flat or unfolded state, a folded state, or an intermediate state.

According to certain embodiments, the pair of housings 310 and 320 may include a first housing 310 (e.g., first housing structure) coupled to the hinge mechanism (e.g., hinge mechanism 340 in FIG. 3B), and a second housing 320 (e.g., second housing structure) coupled to the hinge mechanism (e.g., hinge mechanism 340 in FIG. 3B). According to an embodiment, in the unfolded state, the first housing 310 may include a first surface 311 facing a first direction (e.g., front direction) (z-axis direction), and a second surface 312 facing a second direction (e.g., rear direction) (negative z-axis direction) opposite to the first surface 311. According to an embodiment, in the unfolded state, the second housing 320 may include a third surface 321 facing the first direction (z-axis direction), and a fourth surface 322 facing the second direction (negative z-axis direction). According to an embodiment, the electronic device 300 may be operated in such a manner that the first surface 311 of the first housing 310 and the third surface 321 of the second housing 320 face substantially the same first direction (z-axis direction) in the unfolded state, and the first surface 311 and the third surface 321 face one another in the folded state. According to an embodiment, the electronic device 300 may be operated in such a manner that the second surface 312 of the first housing 310 and the fourth surface 322 of the second housing 320 face substantially the same second direction (negative z-axis direction) in the unfolded state, and the second surface 312 and the fourth surface 322 face one another in opposite directions in the folded state. For example, in the folded state, the second surface 312 may face the first direction (z-axis direction), and the fourth surface 322 may face the second direction (negative z-axis direction).

According to certain embodiments, the first housing 310 may include a first side member 313 that at least partially forms an external appearance of the electronic device 300, and a first rear cover 314 coupled to the first side member 313 that forms at least a portion of the second surface 312 of the electronic device 300. According to an embodiment, the first side member 313 may include a first side surface 313a, a second side surface 313b extending from one end of the first side surface 313a, and a third side surface 313c extending from the other end of the first side surface 313a. According to an embodiment, the first side member 313 may be formed in a rectangular shape (e.g., square or rectangle) through the first side surface 313a, second side surface 313b, and third side surface 313c.

According to certain embodiments, the second housing 320 may include a second side member 323 that at least partially forms the external appearance of the electronic device 300, and a second rear cover 324 coupled to the second side member 323, forming at least a portion of the fourth surface 322 of the electronic device 300. According to an embodiment, the second side member 323 may include a fourth side surface 323a, a fifth side surface 323b extending from one end of the fourth side surface 323a, and a sixth side surface 323c extending from the other end of the fourth side surface 323a. According to an embodiment, the second side member 323 may be formed in a rectangular shape through the fourth side surface 323a, fifth side surface 323b, and sixth side surface 323c.

According to certain embodiments, the pair of housings 310 and 320 are not limited to the shape and combinations illustrated herein, and may be implemented with a combination of other shapes or parts. For example, in certain embodiments, the first side member 313 may be integrally formed with the first rear cover 314, and the second side member 323 may be integrally formed with the second rear cover 324.

According to certain embodiments, in the unfolded state of the electronic device 300, the second side surface 313b of the first side member 313 and the fifth side surface 323b of the second side member 323 may be connected without a gap formed therebetween. According to an embodiment, in the unfolded state of the electronic device 300, the third side surface 313c of the first side member 313 and the sixth side surface 323c of the second side member 323 may be connected without a gap formed therebetween. According to an embodiment, in the unfolded state, the electronic device 300 may be configured such that the combined length of the second side surface 313b and the fifth side surface 323b is longer than the combined length of the first side surface 313a and/or the fourth side surface 323a. In addition, the combined length of the third side surface 313c and the sixth side surface 323c may be configured to be longer than the length of the first side surface 313a and/or the fourth side surface 323a.

According to certain embodiments, the first side member 313 and/or the second side member 323 may be formed of a metal, and may further include a polymer injected into the metal. According to an embodiment, the first side member 313 and/or the second side member 323 may include at least one conductive portion 316 and/or 326 electrically segmented through one or more segmenting portions 3161 and 3162 and/or segmenting 3261 and 3262, which may be formed using a polymer. In this case, the at least one conductive portion may be electrically connected to a wireless communication circuit included in the electronic device 300, and may be used as an antenna operating in at least one designated band (e.g., about 400 MHz to about 6 GHz).

According to certain embodiments, the first rear cover 314 and/or the second rear cover 324 may be formed of, for example, coated or tinted glass, ceramic, polymer, metal (e.g., aluminum, stainless steel or "STS", or magnesium), or a combination thereof.

According to certain embodiments, the flexible display 330 may be disposed to extend from the first surface 311 of the first housing 310 across the hinge mechanism (e.g., hinge mechanism 340 in FIG. 3B) to at least a portion of the third surface 321 of the second housing 320. For example, the flexible display 330 may include a first region 330a substantially corresponding to the first surface 311, a second region 330b corresponding to the second surface 321, and a third region 330c (e.g., the bendable region) connecting the first region 330a and the second region 330b, and corresponding to the hinge mechanism (e.g., hinge mechanism 340 in FIG. 3B). According to an embodiment, the electronic device 300 may include a first protection cover 315 (e.g., first protection frame or first decoration member) coupled along the periphery of the first housing 310. According to an embodiment, the electronic device 300 may include a second protection cover 325 (e.g., second protection frame or second decoration member) coupled along the periphery of the second housing 320. According to an embodiment, the first protection cover 315 and/or the second protection cover 325 may be formed of a metal or polymer material. According to an embodiment, the first protection cover 315 and/or the second protection cover 325 may be used as a decorative member. According to an embodiment, the flexible display 330 may be positioned such that the periphery of the first region 330a is interposed between the first housing 310 and the first protection cover 315. According to an embodiment, the flexible display 330 may be positioned such that the periphery of the second region 330b is interposed between the second housing 320 and the second protection cover 325. According to an embodiment, the flexible display 330 may be positioned such that the periphery of the flexible display 330 corresponding to a protection cap 335 is protected through the protection cap disposed in a region corresponding to the hinge mechanism (e.g., hinge mechanism 340 in FIG. 3B). Consequently, the periphery of the flexible display 330 may be substantially protected from the outside. According to an embodiment, the electronic device 300 may include a hinge housing 341 (e.g., hinge cover) that is disposed so as to support the hinge mechanism (e.g., hinge mechanism 340 in FIG. 3B). The hinge housing 341 may further be exposed to the outside when the electronic device 100 is in the folded state, and be invisible as viewed from the outside when retracted into a first space (e.g., internal space of the first housing 310) and a second space (e.g., internal space of the second housing 320) when the electronic device 300 is in the unfolded state. In certain embodiments, the flexible display 330 may be disposed to extend from at least a portion of the second surface 312 to at least a portion of the fourth surface 322. In this case, the electronic device 300 may be folded so that the flexible display 330 is exposed to the outside (i.e., an out-folding scheme).

According to certain embodiments, the electronic device 300 may include a sub-display 331 disposed separately from the flexible display 330. According to an embodiment, the sub-display 331 may be disposed to be at least partially exposed on the second surface 312 of the first housing 310, and may display status information of the electronic device 300 in place of the display function of the flexible display 330 when in the folded state. According to an embodiment, the sub-display 331 may be disposed to be visible from the outside through at least some region of the first rear cover 314. In certain embodiments, the sub-display 331 may be disposed on the fourth surface 322 of the second housing 320. In this case, the sub-display 331 may be disposed to be visible from the outside through at least some region of the second rear cover 324.

According to certain embodiments, the electronic device 300 may include at least one of an input device 303 (e.g., microphone), sound output devices 301 and 302, a sensor module 304, camera devices 305 and 308, a key input device 306, or a connector port 307. As illustrated, the input device 303 (e.g., microphone), sound output devices 301 and 302, sensor module 304, camera devices 305 and 308, key input device 306, and connector port 307 are indicated by a hole or shape formed in the first housing 310 or the second housing 320, but may include additional electronic components (e.g., input device, sound output device, sensor module, or camera device) that are disposed inside the electronic device 300 and operated through a hole or a shape formed in the first housing 310 or the second housing 320.

According to certain embodiments, the input device may include at least one microphone 303 disposed on the second housing 320. In certain embodiments, the input device may include a plurality of microphones 303 disposed to detect the direction of a sound. In certain embodiments, a plurality of microphones 303 may be disposed at appropriate positions in the first housing 310 and/or the second housing 320. According to an embodiment, the sound output devices may include speakers 301 and 302. According to an embodiment, the sound output devices may include a receiver 301 for calls disposed in the first housing 310, and a speaker 302 disposed in the second housing 320. In certain embodiments, the input device, the sound output devices, and the connector port 307 may be disposed in a space arranged in the first housing 310 and/or the second housing 320 of the electronic device 30, and may be exposed to the external environment through at least one hole formed in the first housing 310 and/or the second housing 320. According to an embodiment, at least one connector port 307 may be used to transmit and receive power and/or data to and from an external electronic device. In certain embodiments, at least one connector port (e.g., ear jack hole) may accommodate a connector (e.g., ear jack) for transmitting and receiving an audio signal to and from an external electronic device. In certain embodiments, the hole formed in the first housing 310 and/or the second housing 320 may be commonly used for the input device and the sound output devices. In certain embodiments, the sound output devices may include a speaker (e.g., piezo speaker) that operates without using a hole formed in the first housing 310 and/or the second housing 320.

According to certain embodiments, the sensor module 304 may generate an electrical signal or data value corresponding to an internal operating state of the electronic device 300 or an external environmental state. The sensor module 304 may detect an external environment, for example, through the first surface 311 of the first housing 310. In certain embodiments, the electronic device 300 may further include at least one sensor module disposed to detect an external environment through the second surface 312 of the first housing 310. According to an embodiment, the sensor module 304 (e.g., illuminance sensor) may be disposed under the flexible display 330 to detect an external environment through the flexible display 330. According to an embodiment, the sensor module 304 may include at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, an illuminance sensor, a proximity sensor, a biometric sensor, an ultrasonic sensor, or an illuminance sensor.

According to certain embodiments, the camera devices 305 and 308 may include a first camera device 305 (e.g., front camera device) disposed on the first surface 311 of the first housing 310, and a second camera device 308 disposed on the second surface 312 of the first housing 310. The electronic device 300 may further include a flash 309 disposed close to the second camera device 308. According to an embodiment, the camera device 305 or 308 may include one or more lenses, an image sensor, and/or an image signal processor. The flash 309 may include, for example, a light emitting diode or a xenon lamp. According to an embodiment, the camera devices 305 and 308 may be arranged so that two or more lenses (e.g., wide-angle lens, super-wide-angle lens, or telephoto lens) and image sensors are positioned on one surface (e.g., first surface 311, second surface 312, third surface 321, or fourth surface 322) of the electronic device 300. In certain embodiments, the camera devices 305 and 308 may include time-of-flight (TOF) lenses and/or an image sensor.

According to certain embodiments, the key input device 306 (e.g., key button) may be disposed on the third side surface 313c of the first side member 313 of the first housing 310. In certain embodiments, the key input device 306 may be disposed on at least one of the other side surfaces 313a and 313b of the first housing 310 and/or the side surfaces 323a, 323b, and 323c of the second housing 320. In certain embodiments, some or all of the key input devices 306 may be omitted from the electronic device 300, and omitted key input devices 306 may be implemented in other forms, such as soft keys, on the flexible display 330. In certain embodiments, the key input device 306 may be implemented by using a pressure sensor included in the flexible display 330.

According to certain embodiments, some of the camera devices 305 and 308 (e.g., first camera device 305) or the sensor module 304 may be disposed to be exposed through the flexible display 330. For example, the first camera device 305 or the sensor module 304 may be arranged in the internal space of the electronic device 300 so as to be in exposed to the external environment through an opening (e.g., through hole) formed at least partially in the flexible display 330. In another embodiment, some sensor modules 304 may be arranged in the internal space of the electronic device 300 so as to perform their functions without being visually exposed through the flexible display 330. For example, in this case, the opening of a region of the flexible display 330 facing the sensor module may be not needed, and the flexibly display 330 may extend over one or more sensor modules 304.

With reference to FIG. 4B, the electronic device 300 may be operated to remain in an intermediate state through the hinge mechanism (e.g., hinge device 340 in FIG. 3B). In this case, the electronic device 300 may control the flexible display 330 to display different pieces of content on the display area corresponding to the first surface 311 and the display area corresponding to the third surface 321. According to an embodiment, the electronic device 300 may be operated substantially in an unfolded state (e.g., unfolded state of FIG. 3A) and/or substantially in a folded state (e.g., folded state of FIG. 4A) with respect to a specific inflection angle (e.g., angle between the first housing 310 and the second housing 320 in the intermediate state) through the hinge mechanism (e.g., hinge mechanism 340 in FIG. 3B). For example, when a pressing force is applied in the unfolding direction (B direction) in a state where the electronic device 300 is unfolded at a specific inflection angle, through the hinge mechanism (e.g., hinge mechanism 340 in FIG. 1B), the electronic device 300 may be transitioned to an unfolded state (e.g., unfolded state of FIG. 3A). For example, when a pressing force is applied in the folding direction (C direction) in a state where the electronic device 300 is unfolded at a specific inflection angle, through the hinge mechanism (e.g., hinge mechanism 340 in FIG. 3B), the electronic device 300 may be transitioned to a closed state (e.g., folded state of FIG. 4A). In an embodiment, the electronic device 300 may be operated to remain in an unfolded state at various angles through the hinge mechanism (e.g., hinge mechanism 340 in FIG. 3B).

Figure 4C:
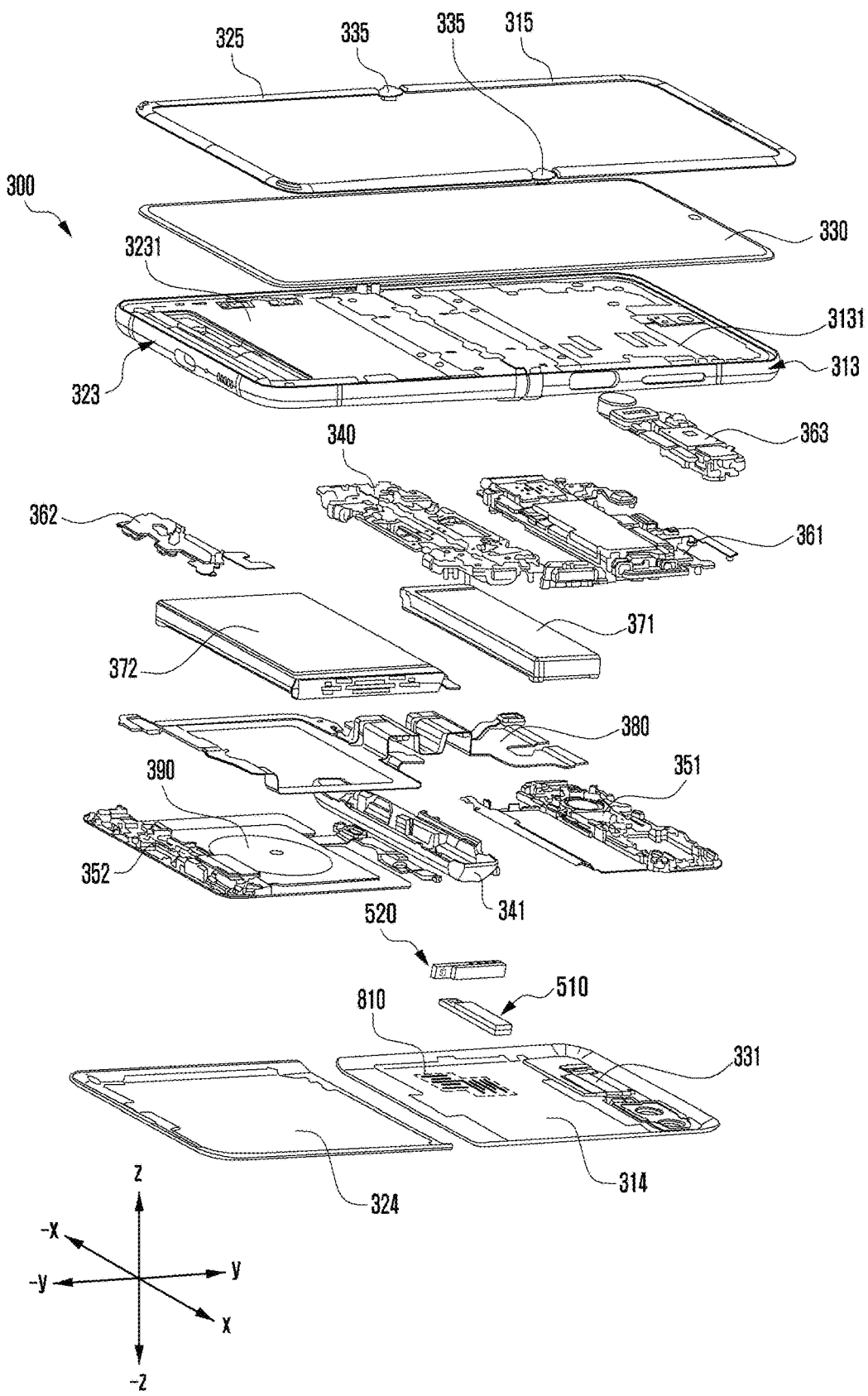
FIG. 4C is an exploded perspective view of the electronic device according to various embodiments.

FIG. 4C is an exploded perspective view of the electronic device according to various embodiments.

With reference to FIG. 4C, the electronic device 300 may include a first side member 313 (e.g., first side frame), a second side member 323 (e.g., second side frame), and a hinge mechanism 340 (e.g., hinge module) rotatably connecting the first side member 313 and the second side member 323. According to an embodiment, the electronic device 300 may include a first support member 3131 (e.g., first support member) at least partially extending from the first side member 313, and a second support member 3231 at least partially extending from the second side member 323. According to an embodiment, the first support member 3131 may be integrally formed with the first side member 313 or may be structurally coupled to the first side member 313. Similarly, the second support member 3231 may be integrally formed with the second side member 323 or may be structurally coupled to the second side member 323. According to an embodiment, the electronic device 300 may include a flexible display 330 disposed to be supported by the first support member 3131 and the second support member 3231. According to an embodiment, the electronic device 300 may include a first rear cover 314 that is coupled to the first side member 313 and provides a first space between itself and the first support member 3131, and a second rear cover 324 that is coupled to the second side member 323 and provides a second space between itself and the second support member 3231. In certain embodiments, the first side member 313 and the first rear cover 314 may be integrally formed. In certain embodiments, the second side member 323 and the second rear cover 324 may be integrally formed. According to an embodiment, the electronic device 300 may include a first housing 310 (e.g., first housing 310 in FIG. 3A) (e.g., first housing structure) provided through the first side member 313, the first support member 3131, and the first rear cover 314. According to an embodiment, the electronic device 300 may include a second housing (e.g., second housing 320 in FIG. 3A) (e.g., second housing structure) provided through the second side member 323, the second support member 3231, and the second rear cover 324. According to an embodiment, the electronic device 300 may include a sub-display 331 that is disposed to be visible from the outside through at least some region of the first rear cover 314.

According to certain embodiments, the electronic device 300 may include a first substrate assembly 361 (e.g., main printed circuit board), a camera assembly 363, a first battery 371, or a first bracket 351, arranged in the first space between the first side member 313 and the first rear cover 314. According to an embodiment, the camera assembly 363 may include a plurality of camera devices (e.g., camera devices 305 and 308 in FIGS. 3A and 4A), and may be electrically connected to the first substrate assembly 361. According to an embodiment, the first bracket 351 may provide a support structure for supporting the first substrate assembly 361 and/or the camera assembly 363, and improved rigidity. According to an embodiment, the electronic device 300 may include a second board assembly 362 (e.g., sub printed circuit board), an antenna 390 (e.g., coil member), a second battery 372, or a second bracket 352, arranged in the second space between the second side member 323 and the second rear cover 324. According to an embodiment, the electronic device 300 may include a wiring member 380 (e.g., FPCB) extending from the first substrate assembly 361 across the hinge mechanism 340 to a plurality of electronic components arranged between the second side member 323 and the second rear cover 324, to provide electrical connections therebetween. According to an embodiment, the antenna 390 may include a near field communication (NFC) antenna, a wireless charging antenna, and/or a magnetic secure transmission (MST) antenna. The antenna 390 may, for example, perform short-range communication with an external device or wirelessly transmit and receive power utilized for charging.

According to certain embodiments, the electronic device 300 may include a hinge housing 341 (e.g., hinge cover) that supports the hinge mechanism 340 and is disposed so as to be exposed to the outside when the electronic device 300 is in the folded state (e.g., folded state of FIG. 4A) and be invisible from the outside by being retracted into the first space and/or the second space when the electronic device 300 is in the unfolded state (e.g., unfolded state of FIG. 3A).

According to certain embodiments, the electronic device 300 may include a first protection cover 315 coupled along the periphery of the first side member 313. According to an embodiment, the electronic device 300 may include a second protection cover 325 coupled along the periphery of the second side member 323. According to an embodiment, in the flexible display 330, the periphery of a first flat portion (e.g., first flat portion 330a in FIG. 3B) may be protected by the first protection cover 315. According to an embodiment, in the flexible display 330, the periphery of a second flat portion (e.g., second flat portion 330b in FIG. 3B) may be protected by the second protection cover 325. According to an embodiment, the electronic device 300 may include a protection cap 335 that protects the periphery of the third region (e.g., third region 330c in FIG. 3B) of the flexible display 330 corresponding to the hinge mechanism 340.

According to certain embodiments, the first support member 3131 may include a first support surface facing a first direction (z-axis direction), and a second support surface facing a second direction (negative z-axis direction) opposite to the first direction. According to an embodiment, the second support member 3231 may include a third support surface facing the first direction, and a fourth support surface facing the second direction in the unfolded state. According to an embodiment, the flexible display 330 may be supported by the first support surface of the first support member 3131 and the third support surface of the second support member 3231.

In various embodiments, an electronic device 300 may include a plurality of antenna structures, for example, a first antenna structure 510 and a second antenna structure 520. The plurality of antenna structures 510 and 520 may be configured to operate in a frequency band (e.g., the mmWave band) of about 25 GHz to 45 GHz.

In various embodiments, the first antenna structure 510 and the second antenna structure 520 may be disposed in the inner space of a first housing 310. For example, the first antenna structure 510 may be disposed in the inner space of the first housing 310 (e.g., the space between a first support member 3131 and a first rear cover 314) to form a first electric field (e.g., a first directional beam) in a second direction (e.g., the −z-axis direction) so as to pass through the first rear cover 314. In an embodiment, the first antenna structure 510 may be mounted on a first mounting part (e.g., the first mounting part 505 in FIG. 5) provided in the inner space of the first housing 310. In an embodiment, the first antenna structure 510 may be disposed in an area that does not overlap a hinge structure 340. The second antenna structure 520 may be disposed in the inner space of the first housing 310 (e.g., the space between the first support member 3131 and the first rear cover 314) to form a second electric field (e.g., a second directional beam) in a third direction (e.g., the −x-axis direction) perpendicular to the second direction (e.g., the −z-axis direction). For example, the second antenna structure 520 may be mounted on a second mounting part (e.g., the second mounting part 515 in FIG. 5) provided in the first side member 313, and the second electric field may pass through the first side member 313.

In various embodiments, the electronic device 300 may include a conductive member 810 (e.g., a periodic structure) for reducing near-field interference between the first antenna structure 510 and the second antenna structure 520. In an embodiment, the conductive member 810 may be provided between the first antenna structure 510 and the second antenna structure 520 when the first rear cover 314 is viewed from above. In an embodiment, the conductive member 810 may be formed of any one of a metal tape, a graphite sheet, a metal sheet, a conductive ink, or a metal material. For example, the conductive member 810 may be formed by attaching a metal tape to the inner surface of the first rear cover 314. As another example, in the case where the inner surface of the first rear cover 314 is formed of a graphite sheet and a metal sheet, the conductive member 810 may be formed by etching the metal sheet into a pattern. As another example, the conductive member 810 may be formed by printing conductive ink on the inner surface of the first rear cover 314. As another example, the conductive member 810 may be formed by scattering a metal material on the inner surface of the first rear cover 314.

The first antenna structure 510, the second antenna structure 520, and the conductive member 810 described above according to various embodiments will be described in detail with reference to FIGS. 5 to 12.

Figure 5:
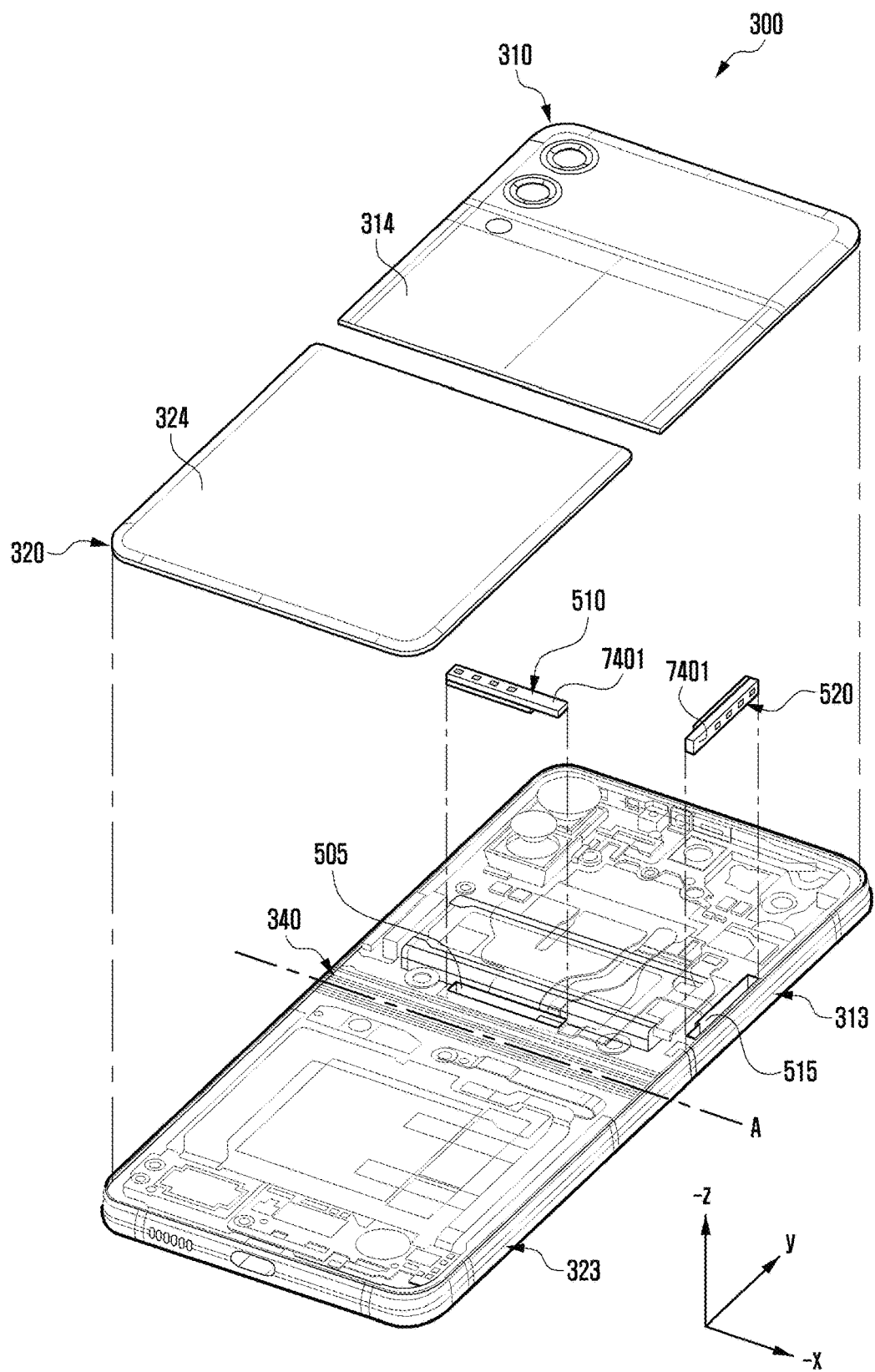
FIG. 5 is a diagram illustrating an arrangement of a plurality of antenna structures according to various embodiments.

FIG. 5 is a diagram illustrating an arrangement of a plurality of antenna structures 510 and 520 according to various embodiments.

Referring to FIG. 5, an electronic device (e.g., the electronic device 300 in FIG. 3A) may include a first housing (e.g., the first housing 310 in FIG. 3A) including a first support member (e.g., the first support member 3131 in FIG. 4C) facing in a first direction (e.g., the z-axis direction), a first rear cover (e.g., the first rear cover 314 in FIG. 3C) facing in a second direction (e.g., the −z-axis direction) opposite the direction of the first support member 3131, and a first side member (e.g., the first side member 313 in FIG. 3A) surrounding the space between the first support member 3131 and the first rear cover 314. The electronic device 300 may include a second housing (e.g., the second housing 320 in FIG. 3A) that is connected to the first housing 310 so as to be folded about a folding axis (the axis A) through a hinge structure (e.g., the hinge structure 340 in FIG. 3B), a second support member (e.g., the support member 3231 in FIG. 4C) facing in the first direction (e.g., the z-axis direction), a second rear cover (e.g., the second rear cover 324 in FIG. 3C) facing in a second direction (e.g., the −z-axis direction) opposite the direction of the second support member 3231, and a second side member (e.g., the second side member 323 in FIG. 3A) surrounding the space between the second support member 3231 and the second rear cover 324.

In various embodiments, the first support member 3131 may be integrally formed with the first side member 313 or may be structurally coupled to the first side member 313. Similarly, the second support member 3231 may be integrally formed with the second side member 323 or may be structurally coupled to the second side member 323.

In various embodiments, the first rear cover 314 and/or the second rear cover 324 may be formed of at least one piece of coated or tinted glass, ceramic, polymer, or metal (e.g., aluminum, stainless steel (STS), or magnesium), or a combination of at least two of them.

In various embodiments, the electronic device 300 may include a plurality of antenna structures, for example, a first antenna structure 510 and a second antenna structure 520. The plurality of antenna structures 510 and 520 may be configured to operate in a frequency band (e.g., the mmWave band) of about 25 GHz to 45 GHz. For example, the first antenna structure 510 may be configured to operate in a frequency band of about 28 GHz. The second antenna structure 520 may be configured to operate in a frequency band of about 39 GHz. However, not limited thereto.

In various embodiments, the first antenna structure 510 and the second antenna structure 520 may be disposed in the inner space of the first housing 310. For example, the first antenna structure 510 may be disposed in the inner space of the first housing 310 (e.g., the space between the first support member 3131 and the first rear cover 314) to form a first electric field (e.g., a first directional beam) in a second direction (e.g., the −z-axis direction) so as to pass through the first rear cover 314. For example, the first antenna structure 510 may include an array antenna AR including a plurality of conductive patches (e.g., 731, 733, 735, and 737 in FIG. 7C) as antenna elements. The plurality of conductive patches 731, 733, 735, and 737 may be disposed on a first substrate surface (e.g., the first substrate surface 7401 in FIG. 7C) of a substrate (e.g., the substrate 740 in FIG. 7C). For example, the plurality of conductive patches 731, 733, 735, and 737 may be disposed to be at least partially exposed through the first substrate surface 7401 of the substrate 740 or inserted into the substrate 740, and may thereby form a first electric field (e.g., a first directional beam) in the second direction (e.g., the −z-axis direction). In an embodiment, the first antenna structure 510 may be mounted on a first mounting part 505 provided in the inner space of the first housing 310 such that the first substrate surface 7401 of the substrate 740 faces the first rear cover 314. In an embodiment, the first antenna structure 510 may be disposed in an area that does not overlap the hinge structure 340.

In various embodiments, the second antenna structure 520 may be disposed in the inner space of the first housing 310 (e.g., the space between the first support member 3131 and the first rear cover 314) to form a second electric field (e.g., a second directional beam) in a third direction (e.g., the −x-axis direction) perpendicular to the second direction (e.g., the −z-axis direction), such that the second electric field may pass through the first side member 313. For example, like the first antenna structure 510, the second antenna structure 520 may include a plurality of conductive patches (731, 733, 735, and 737 in FIG. 7C) disposed on the first substrate surface 7401 of the substrate 740. For example, the plurality of conductive patches 731, 733, 735, and 737 may be disposed to be at least partially exposed through the first substrate surface 7401 of the substrate 740 or inserted into the substrate 740, and may thereby form a second electric field (e.g., a second directional beam) in the third direction (e.g., the −x-axis direction). In an embodiment, the second antenna structure 520 may be mounted on a second mounting part 515 provided in the first side member 313 such that the first substrate surface 7401 of the substrate 740 faces the first side member 313.

Figure 6A:
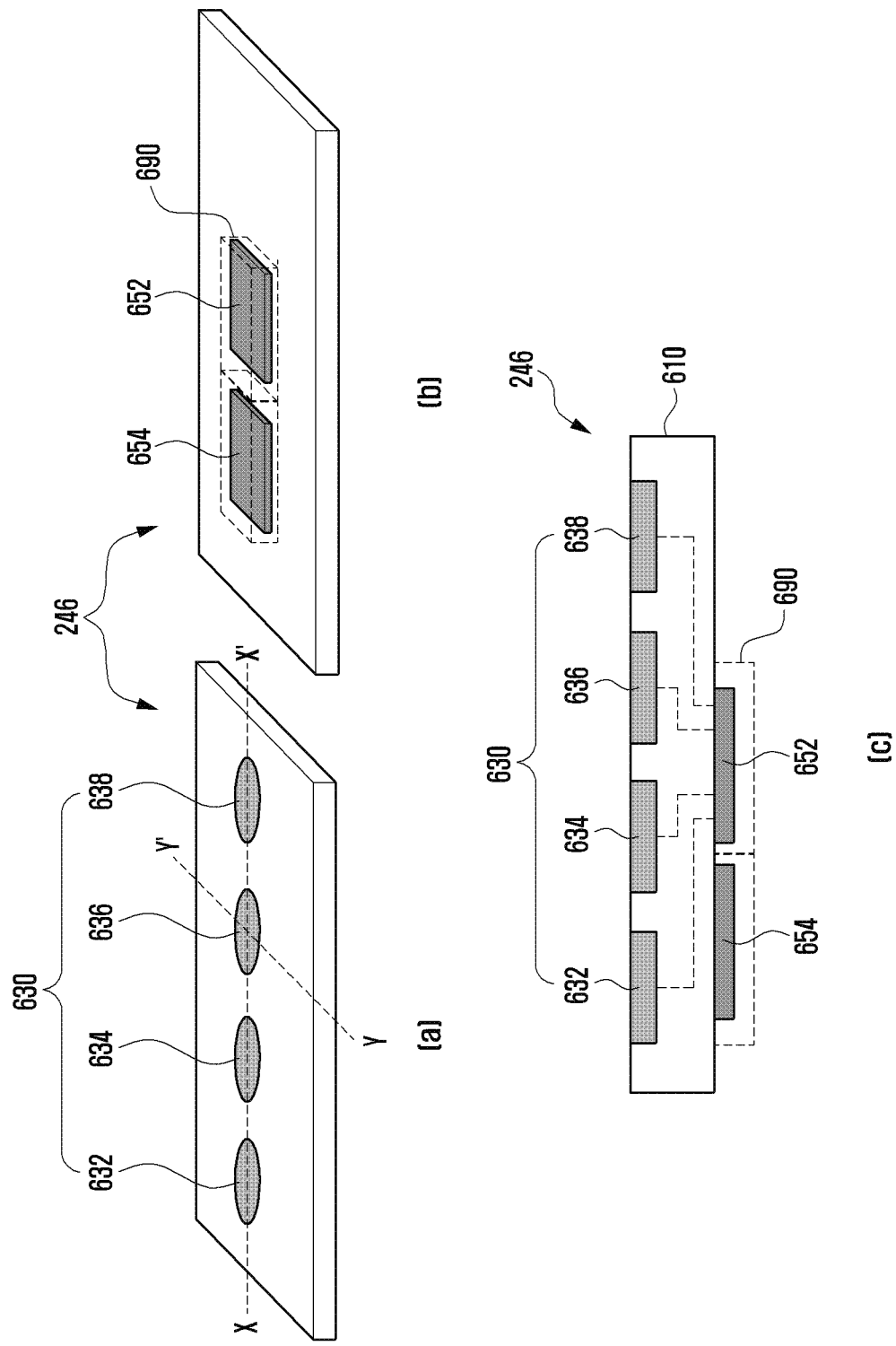
FIG. 6A is a diagram illustrating a structure of, for example, a third antenna module described with reference to FIG. 2, according to various embodiments.

FIG. 6A is a diagram illustrating a structure of, for example, a third antenna module described with reference to FIG. 2 according to various embodiments.

FIG. 6A, view (a) is a perspective view illustrating the third antenna module 246 viewed from one side, and FIG. 6A, view (b) is a perspective view illustrating the third antenna module 246 viewed from the other side. FIG. 6A, view (c) is a cross-sectional view illustrating the third antenna module 246 taken along line X-X' of FIG. 6A.

With reference to FIG. 6A, in one embodiment, the third antenna module 246 may include a printed circuit board 610, an antenna array 630, a RFIC 652, and a PMIC 654. Alternatively, the third antenna module 246 may further include a shield member 690. In other embodiments, at least one of the above-described components may be omitted or at least two of the components may be integrally formed.

The printed circuit board 610 may include a plurality of conductive layers and a plurality of non-conductive layers stacked alternately with the conductive layers. The printed circuit board 610 may provide electrical connections between the printed circuit board 610 and/or various electronic components disposed outside using wirings and conductive vias formed in the conductive layer.

The antenna array 630 (e.g., 248 of FIG. 2) may include a plurality of antenna elements 632, 634, 636, or 638 disposed to form a directional beam. As illustrated, the antenna elements 632, 634, 636, or 638 may be formed at a first surface of the printed circuit board 610. According to another embodiment, the antenna array 630 may be formed inside the printed circuit board 610. According to the embodiment, the antenna array 630 may include the same or a different shape or kind of a plurality of antenna arrays (e.g., dipole antenna array and/or patch antenna array).

The RFIC 652 (e.g., the third RFIC 226 of FIG. 2) may be disposed at another area (e.g., a second surface opposite to the first surface) of the printed circuit board 610 spaced apart from the antenna array. The RFIC 652 is configured to process signals of a selected frequency band transmitted/received through the antenna array 630. According to one embodiment, upon transmission, the RFIC 652 may convert a baseband signal obtained from a communication processor (not shown) to an RF signal of a designated band. Upon reception, the RFIC 652 may convert an RF signal received through the antenna array 630 to a baseband signal and transfer the baseband signal to the communication processor.

According to another embodiment, upon transmission, the RFIC 652 may up-convert an IF signal (e.g., about 9 GHz to about 11 GHz) obtained from an intermediate frequency integrate circuit (IFIC) (e.g., 228 of FIG. 2) to an RF signal of a selected band. Upon reception, the RFIC 652 may down-convert the RF signal obtained through the antenna array 630, convert the RF signal to an IF signal, and transfer the IF signal to the IFIC.

The PMIC 654 may be disposed in another partial area (e.g., the second surface) of the printed circuit board 610 spaced apart from the antenna array 630. The PMIC 654 may receive a voltage from a main PCB (e.g. a main printed circuit board 1125 of FIG. 11) to provide power necessary for various components (e.g., the RFIC 652) on the antenna module.

The shielding member 690 may be disposed at a portion (e.g., the second surface) of the printed circuit board 610 so as to electromagnetically shield at least one of the RFIC 652 or the PMIC 654. According to one embodiment, the shield member 690 may include a shield can.

Although not shown, in various embodiments, the third antenna module 646 may be electrically connected to another printed circuit board (e.g., main circuit board) through a module interface. The module interface may include a connecting member, for example, a coaxial cable connector, board to board connector, interposer, or flexible printed circuit board (FPCB). The RFIC 652 and/or the PMIC 654 of the antenna module may be electrically connected to the printed circuit board through the connection member.

In various embodiments, the third antenna module 246 may be an antenna structure (e.g., the first antenna structure 510 or the second antenna structure 520) illustrated in FIG. 5.

Figure 6B:
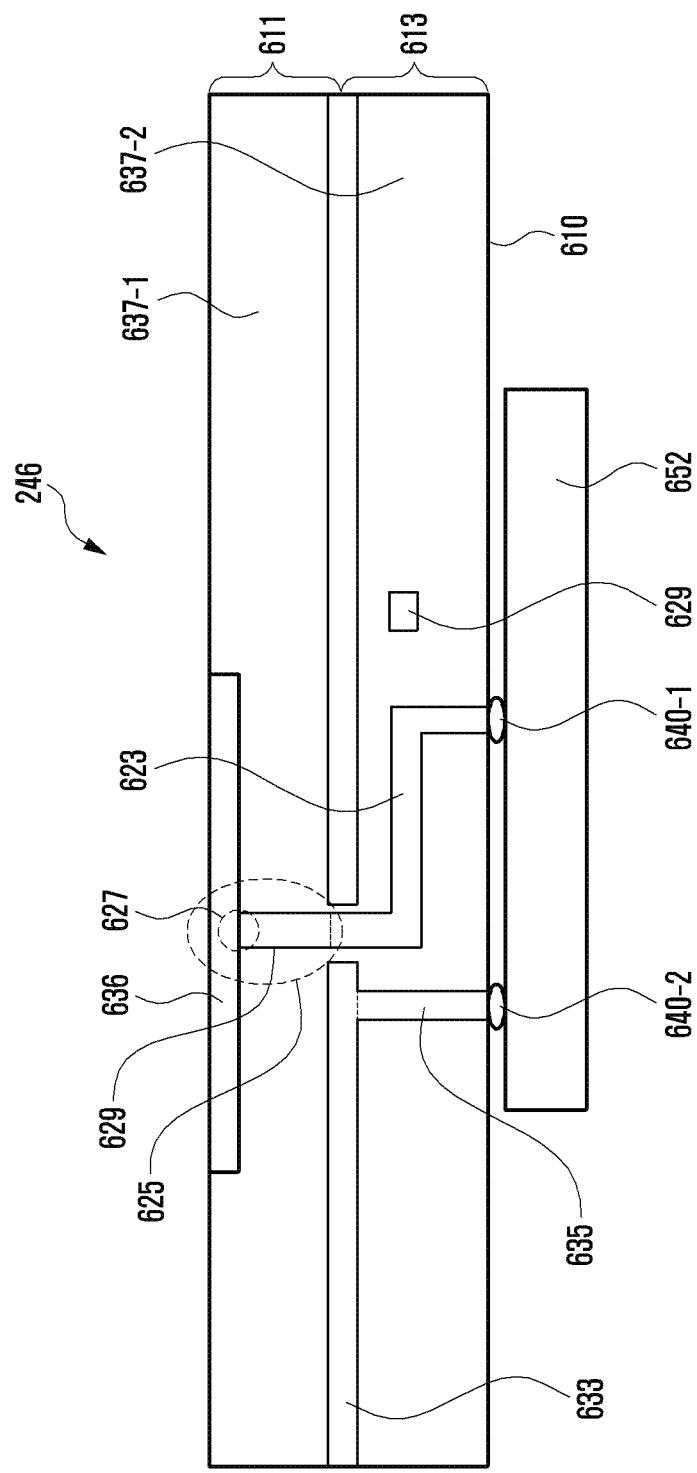
FIG. 6B is a cross-sectional view illustrating the third antenna module taken along line Y-Y' of FIG. 6A according to various embodiments.

FIG. 6B is a cross-sectional view illustrating the third antenna module 246 taken along line Y-Y' of FIG. 6A according to various embodiments.

The printed circuit board 610 of the illustrated embodiment may include an antenna layer 611 and a network layer 613.

Referring to FIG. 6B, the antenna layer 611 may include at least one dielectric layer 637-1, an antenna element 636 and/or a power feeding portion 625 formed on or inside an outer surface of a dielectric layer. The power feeding portion 625 may include a power feeding point 627 and/or a power feeding line 629.

The network layer 613 may include at least one dielectric layer 637-2, at least one ground layer 633, at least one conductive via 635, a transmission line 623, and/or a power feeding line 629 formed on or inside an outer surface of the dielectric layer.

Further, as illustrated, the RFIC 652 (e.g., the third RFIC 226 of FIG. 2) of view (c) of FIG. 6A may be electrically connected to the network layer 613 through, for example, first and second solder bumps 640-1 and 640-2. In other embodiments, various connection structures (e.g., solder or ball grid array (BGA)) instead of the solder bumps may be used. The RFIC 652 may be electrically connected to the antenna element 636 through the first solder bump 640-1, the transmission line 623, and the power feeding portion 625. The RFIC 652 may also be electrically connected to the ground layer 633 through the second solder bump 640-2 and the conductive via 635. Also, the RFIC 652 may be electrically connected to the above-described module interface through the power feeding line 629.

Figure 7A:
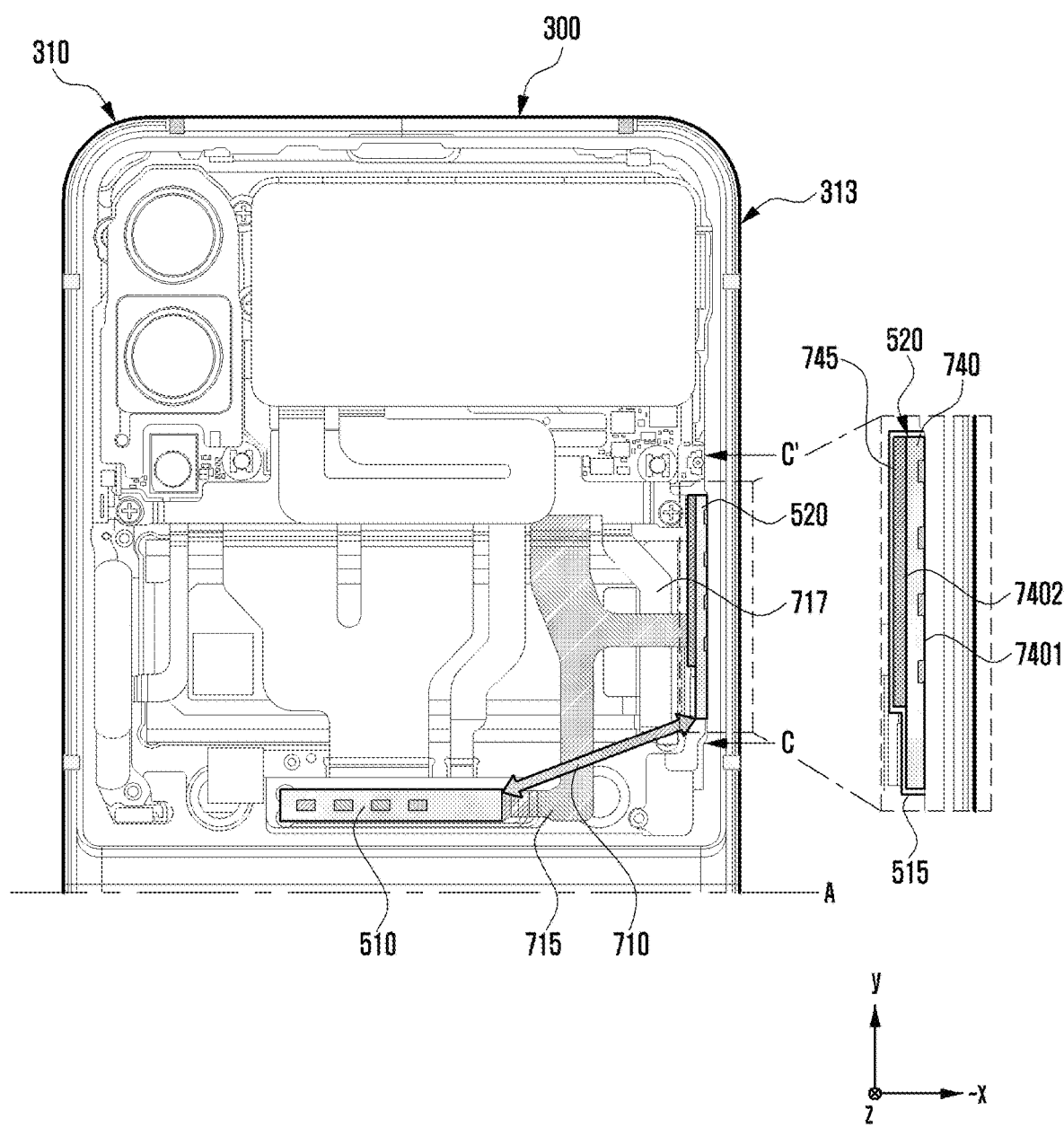
FIG. 7A is a diagram illustrating an arrangement of a plurality of antenna structures according to various embodiments.

FIG. 7A is a diagram illustrating an arrangement of a plurality of antenna structures 510 and 520 according to various embodiments.

Referring to FIG. 7A, as shown in FIG. 5 above, an electronic device (e.g., the electronic device 300 in FIG. 3A) may include a first housing (e.g., the first housing 310 in FIG. 3A) including a first support member (e.g., the first support member 3131 in FIG. 4C) facing in a first direction (e.g., the z-axis direction), a first rear cover (e.g., the first rear cover 314 in FIG. 3C) facing in a second direction (e.g., the −z-axis direction) opposite the direction of the first support member 3131, and a first side member (e.g., the first side member 313 in FIG. 3A) surrounding the space between the first support member 3131 and the first rear cover 314.

In various embodiments, the electronic device 300 may include a plurality of antenna structures, for example, a first antenna structure 510 and a second antenna structure 520, configured to operate in a frequency band (e.g., the mmWave band) of about 25 GHz to 45 GHz.

In an embodiment, the first antenna structure 510 may be disposed in the inner space of the first housing 310 to form a first electric field (e.g., a first directional beam) in a second direction (e.g., the −z-axis direction) so as to pass through the first rear cover 314. The second antenna structure 520 may be disposed in the inner space of the first housing 310 to form a second electric field (e.g., a second directional beam) in a third direction (e.g., the −x-axis direction) perpendicular to the second direction (e.g., the −z-axis direction), such that the second electric field may pass through the first side member 313. For example, each of the first antenna structure 510 and the second antenna structure 520 may include a plurality of conductive patches (e.g., 731, 733, 735, and 737 in FIG. 7B) that are disposed to be at least partially exposed through a first substrate surface 7401 of a substrate 740 or inserted into the substrate 740.

In various embodiments, the second antenna structure 520 may be mounted on a second mounting part 515 provided in the first side member 313 such that the first substrate surface (e.g., the first substrate surface 7401 in FIG. 7B) of the substrate (e.g., the substrate 740 in FIG. 7C) faces the first side member 313. The second antenna structure 520 may include a protective member 745 disposed to at least partially surround an RFIC (e.g., the RFIC 652 in FIG. 6A) and/or a PMIC (e.g., the PMIC 654 in FIG. 6A) that is disposed on a second substrate surface (e.g., the second substrate surface 7402 in FIG. 7C) facing in the opposite direction of the first substrate surface 7401 of the substrate 740.

In various embodiments, the first antenna structure 510 may be mounted on a first mounting part 505 provided in the inner space of the first housing 310 such that the first substrate surface 7401 of the substrate 740 faces the first rear cover 314.

In various embodiments, the first antenna structure 510 and the second antenna structure 520 may be electrically connected to a main PCB (e.g., the first substrate assembly 361 in FIG. 4C) through an electrical connection member 715 (or a wiring member) (e.g., an FPCB connector or a flexible RF cable (FRC)). For example, the electrical connection member 715 may include a plurality of connectors disposed at the ends thereof. The connector (e.g., the connector 760 in FIG. 7C) of the first antenna structure 510 may be connected to a connector disposed at one end of the electrical connection member 715. The connector (e.g., the connector 760 in FIG. 7C) of the second antenna structure 520 may be connected to a connector disposed at the opposite end of the electrical connection member 715. The connector disposed at another end of the electrical connection member 715 may be connected to the main PCB. Accordingly, the first antenna structure 510, the second antenna structure 520, and the main PCB may be electrically connected.

However, embodiments are not limited thereto. For example, the first antenna structure 510 may be electrically connected to the main PCB through a first electrical connection member (e.g., an FPCB connector or a flexible RF cable (FRC)), and the second antenna structure 520 may be electrically connected to the main PCB through a second electrical connection member (e.g., an FPCB connector or a flexible RF cable (FRC)). For example, each of the first electrical connection member and the second electrical connection member may include connectors disposed at both ends thereof. The connector 760 of the first antenna structure 510 may be connected to a connector disposed at one end of the first electrical connection member. The connector disposed at the opposite end of the first electrical connection member may be connected to the main PCB. Accordingly, the first antenna structure 510 and the main PCB may be electrically connected. As another example, the connector 760 of the second antenna structure 520 may be connected to a connector disposed at one end of the second electrical connection member. The connector disposed at the opposite end of the second electrical connection member may be connected to the main PCB. Accordingly, the second antenna structure 520 and the main PCB may be electrically connected.

In various embodiments, the first antenna structure 510 may be disposed on the back side (e.g., the −z-axis direction) of the electrical connection member 715 (e.g., an FPCB connector, a flexible RF cable (FRC), or the wiring member 380 in FIG. 4C). The second antenna structure 520 may be disposed on the back side (e.g., the −z-axis direction) of the electrical connection member 715 (e.g., an FPCB connector or a flexible RF cable (FRC)), or may be disposed on the front side (e.g., the z-axis direction) thereof. For example, the connector 760 of the second antenna structure 520 and the connector disposed at the opposite end of the electrical connection member 715 may be electrically connected, and the electrical connection member 715 may be disposed on the back side (e.g., the −z-axis direction) of another electrical connection member 717 (e.g., a battery connector) (or the wiring member 380 in FIG. 4C) or may be disposed on the front side (e.g., the z-axis direction) thereof to be connected to the main PCB. However, embodiments are not limited thereto.

In various embodiments, the first antenna structure 510 and the second antenna structure 520 may be disposed to be spaced apart from each other by a specified distance 710. For example, the first antenna structure 510 may be disposed to be spaced apart from the second antenna structure 520 by a specified distance 710 (e.g., about 100 mm or less (e.g., within a maximum length center frequency of 10λ)). For example, in the case where the electronic device 300 is a foldable electronic device, an electrical connection member (e.g., an FPCB or an FRC) may connect a plurality of antenna structures (e.g., the first antenna structure 510 and the second antenna structure 520), which are configured to operate in a frequency band (e.g., the mmWave band) of about 25 GHz to 45 GHz, in the inner space of the first housing (e.g., the first housing 310 in FIG. 3A) and the inner space of the second housing (e.g., the second housing 320 in FIG. 3A), based on a hinge structure (e.g., the hinge structure 340 in FIG. 3B). In this case, because intermediate frequency (IF) loss is large, it may be difficult to dispose a plurality of antenna structures in the inner space of the first housing 310 and the inner space of the second housing 320. In addition, spaces in which various modules are to be disposed may be preferentially allocated to the inner space of an electronic device, and a plurality of antenna structures 510, an RFIC (e.g., the RFIC 652 in FIG. 6A), and a power supply part (e.g., the power supply unit 625 in FIG. 6B) may be minimized, so that a plurality of antenna structures, for example, the first antenna structure 510 and the second antenna structure 520, may be spaced apart from each other by a specified distance 710. In an embodiment, the specified distance 710 may indicate a separation distance between the ends of each antenna structure. Embodiments are not limited thereto, and the specified distance 710 may indicate a distance between a feeding point of the first antenna structure 510 and a feeding point of the second antenna structure 520.

Figure 7B:
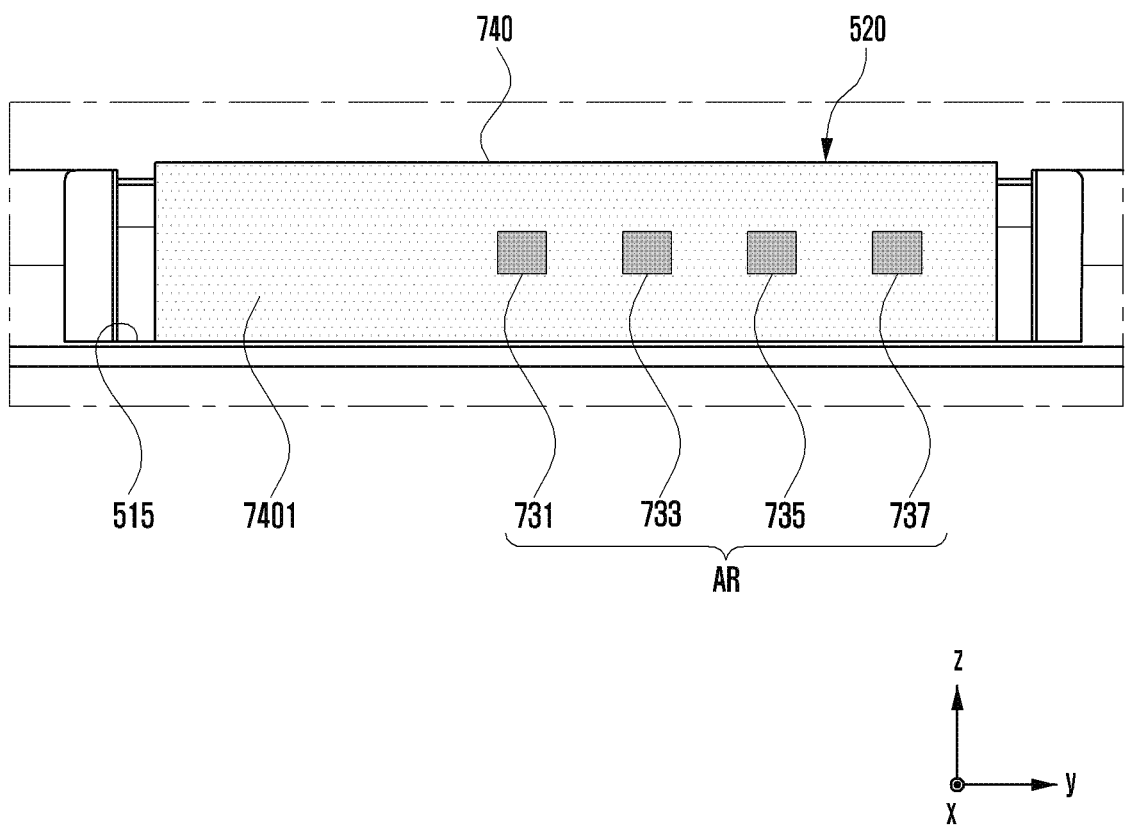
FIG. 7B is a partial cross-sectional view of an electronic device taken along line C-C' in FIG. 7A according to various embodiments.

FIG. 7B is a partial-cross-sectional view of an electronic device 300 taken along line C-C' in FIG. 7A according to various embodiments.

Referring to FIG. 7B, the substrate 740 of the second antenna structure 520 may be mounted on a second mounting part 515 of the first side member 313 when a side member (e.g., the first side member 313) is viewed from the outside. The second antenna structure 520 may be disposed on the first substrate surface 7401 of the substrate 740. For example, the second antenna structure 520 may include an array antenna AR including a plurality of conductive patches 731, 733, 735, and 737. The plurality of conductive patches 731, 733, 735, and 737 may be disposed to be at least partially exposed through the first substrate surface 7401 of the substrate 740 or inserted into the substrate 740, and may thereby form an electric field in the −x-axis direction.

Figure 7C:
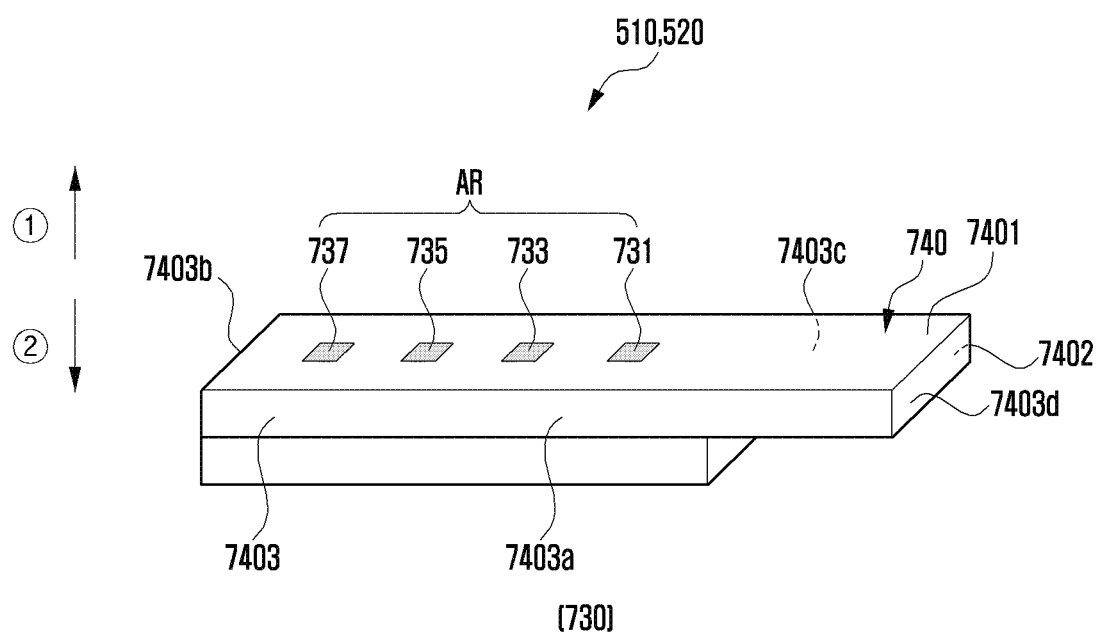
FIG. 7C is a diagram illustrating an antenna structure according to various embodiments.
Figure 7C:
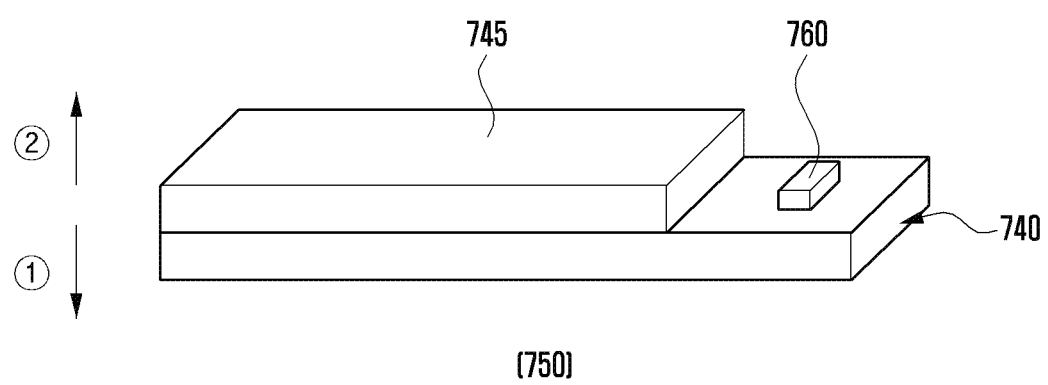

FIG. 7C is a diagram illustrating antenna structures 510 and 520 according to various embodiments.

Reference number 730 in FIG. 7C indicates a perspective view of an antenna structure according to various embodiments (e.g., the first antenna structure 510 or the second antenna structure 520 in FIG. 5) when viewed from one side, and reference number 750 indicates a view of the antenna structure 510 or 520 when viewed from the other side.

The antenna structure 510 or 520 in FIG. 7C according to various embodiments may be at least partially similar to the third antenna module 246 in FIGS. 2, 6A, and 6B described above, or other embodiments of the antenna structure may be further included.

Referring to FIG. 7C, as shown in the view identified by reference number 730, the antenna structure 510 or 520 may include an array antenna AR including a plurality of conductive patches 731, 733, 735, and 737 as antenna elements. In an embodiment, the plurality of conductive patches 731, 733, 735, and 737 may be disposed on a substrate 740 (e.g., a printed circuit board). The substrate 740 may include a first substrate surface 7401 facing in a first direction (e.g., the direction ①), a second substrate surface 7402 facing in a second direction (e.g., the direction ②) opposite the direction of the first substrate surface 7401, and a substrate side-surface 7403 surrounding the space between the first substrate surface 7401 and the second substrate surface 7402. The plurality of conductive patches 731, 733, 735, and 737 may be disposed to be at least partially exposed through the first substrate surface 7401 or may be inserted into the substrate 740, and may thereby form a beam pattern (or directional beam or an electric field) in the first direction (e.g., the direction ①).

In an embodiment, the conductive patches 731, 733, 735, and 737 may have substantially the same shape. Although it has been described that the antenna structure 510 or 520 may be an array antenna AR including four conductive patches 731, 733, 735, and 737, embodiments are not limited thereto. For example, the antenna structure 510 or 520 may include a single conductive patch, or may include two or five or more conductive patches as an array antenna AR.

In an embodiment, the substrate side-surface 7403 may include a first substrate side-surface 7403a having a first length, a second substrate side-surface 7403b extending perpendicularly from the first substrate side-surface 7403a and having a second length less than the first length, a third substrate side-surface 7403c extending parallel to the first substrate side-surface 7403a from the second substrate side-surface 7403b and having the first length, and a fourth substrate side-surface 7403d extending parallel to the second substrate side-surface 7403b from the third substrate side-surface 7403c and having the second length.

In an embodiment, the antenna structure (e.g., the first antenna structure 510) may be disposed in the inner space of the electronic device (e.g., the electronic device 300 in FIG. 3A) such that the first substrate surface 7401 of the substrate 740 faces at least a portion of a first rear cover (e.g., the first rear cover 314 in FIG. 3C) of a first housing (e.g., the first housing 310 in FIG. 3A).

In an embodiment, the antenna structure (e.g., the second antenna structure 520) may be disposed in the inner space of the electronic device 300 such that the first substrate surface 7401 of the substrate 740 faces a second side surface (e.g., the second side surface 313b in FIG. 3A) of the first housing 310.

In various embodiments, as shown by reference numeral 750, the antenna structure 510 or 520 may include an RFIC (e.g., the RFIC 652 in FIG. 6A) and/or a PMIC (e.g., the PMIC 654 in FIG. 6A) disposed in a portion of the second substrate surface 7402 of the substrate 740. In an embodiment, the plurality of conductive patches 731, 733, 735, and 737 may be electrically connected to the RFIC 652 through a wire structure inside the substrate 740. The PMIC 654 may receive a voltage from a main PCB and provide power required for the RFIC 652. In an embodiment, the antenna structure 510 or 520 may include a protective member 745 disposed to at least partially surround the RFIC 652 and/or PMIC 654. The protective member 745 may be a protective layer disposed to surround the RFIC 652 and/or the PMIC 654, and may include a dielectric that is applied and then cured and/or solidified. Embodiments are not limited thereto, and the protective member 745 may include an epoxy resin. In an embodiment, the protection member 745 may be disposed to surround the entirety or a portion of the RFIC 652 and/or the PMIC 654 on the second substrate surface 7402 of the substrate 740.

In various embodiments, the antenna structure 510 or 520 may include a connector 760 to be electrically connected to another printed circuit board (e.g., a flexible printed circuit board (FPCB)) through a connection member. For example, the connection member may include a coaxial cable connector, a board-to-board connector, an interposer, an FRC, or an FPCB.

In various embodiments, the antenna structure 510 or 520 may include a conductive shielding layer (e.g., the shielding member 690 in FIG. 6A) stacked on the surface of the protective member 745. A conductive shielding layer may prevent noise (e.g., DC-DC noise or an interference frequency component) generated in the antenna structure 510 or 520 from spreading to the surroundings. The conductive shielding layer 690 may include a conductive material that is applied to the surface of the protective member 745 by a thin-film deposition method such as sputtering. In an embodiment, the conductive shielding layer 690 may be electrically connected to the ground of the substrate 740. In some embodiments, the conductive shielding layer 690 may be disposed to extend to at least a portion of the substrate side-surface 7403 including the protection member 745. In some embodiments, the protection member 745 and/or the conductive shielding layer 690 may be replaced with a shield can that is mounted on the substrate 740.

Figure 8:
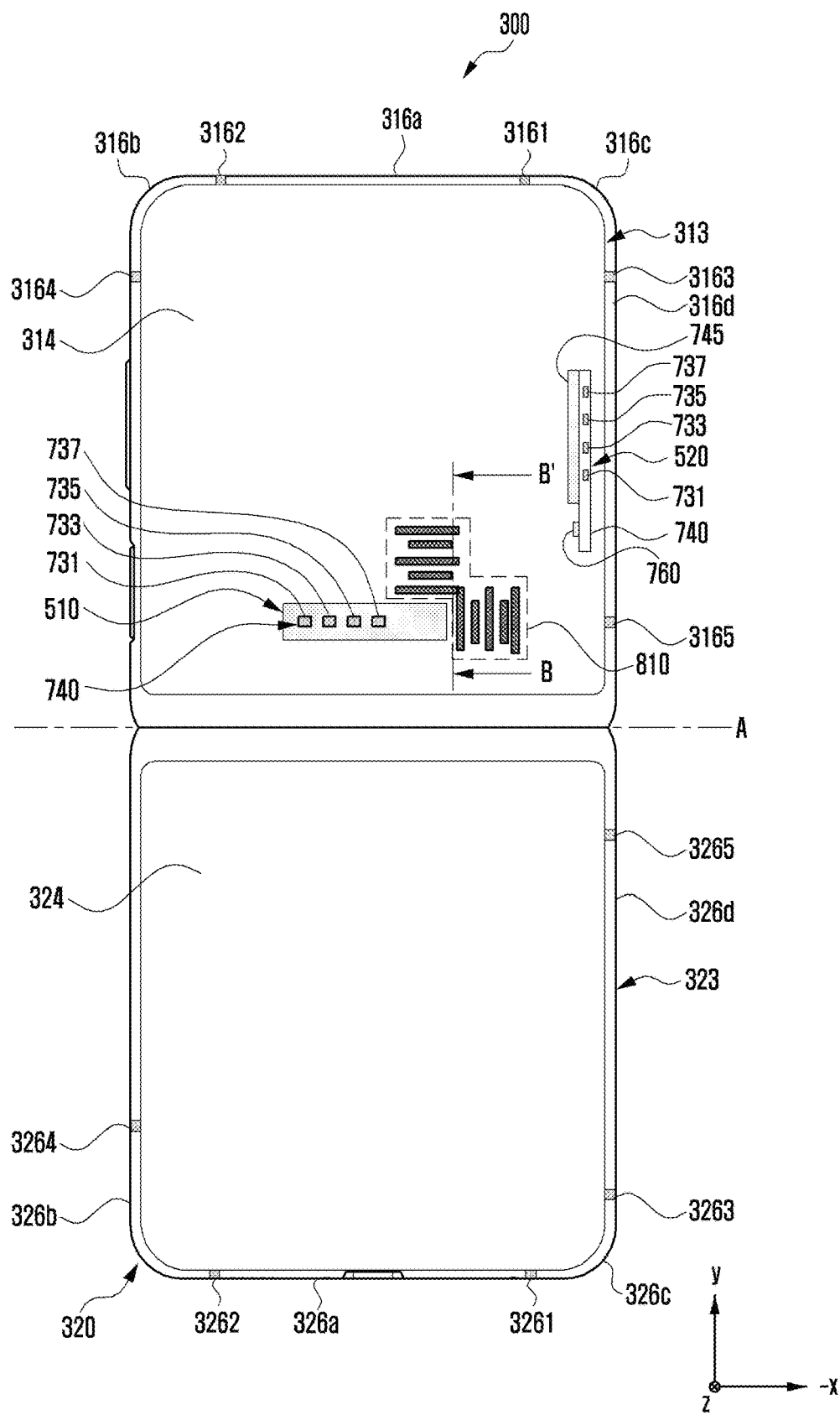
FIG. 8 is a diagram illustrating a structure in which a first antenna structure, a second antenna structure, and a conductive member are disposed according to various embodiments.

FIG. 8 is a diagram illustrating a structure in which a first antenna structure 510, a second antenna structure 520, and a conductive member 810 are disposed according to various embodiments.

Referring to FIG. 8, as shown in FIG. 5 above, an electronic device (e.g., the electronic device 300 in FIG. 3A) may include a first housing (e.g., the first housing 310 in FIG. 3A) including a first support member (e.g., the first support member 3131 in FIG. 4C) facing in a first direction (e.g., the z-axis direction), a first rear cover (e.g., the first rear cover 314 in FIG. 3C) facing in a second direction (e.g., the −z-axis direction) opposite the direction of the first support member 3131, and a first side member (e.g., the first side member 313 in FIG. 3A) surrounding the space between the first support member 3131 and the first rear cover 314. The electronic device 300 may include a second housing (e.g., the second housing 320 in FIG. 3A) that is connected to the first housing 310 so as to be folded about a folding axis (the axis A) through a hinge structure (e.g., the hinge structure 340 in FIG. 3B), a second support member (e.g., the support member 3231 in FIG. 4) facing in the first direction (e.g., the z-axis direction), a second rear cover (e.g., the second rear cover 324 in FIG. 3C) facing in a second direction (e.g., the −z-axis direction) opposite the direction of the second support member 3231, and a second side member (e.g., the second side member 323 in FIG. 3A) surrounding the space between the second support member 3231 and the second rear cover 324.

In various embodiments, the first side member 313 and/or the second side member 323 may include one or more conductive portions 316a, 316b, 316c, and 316d and/or 326a, 326b, 326c, and 326d that are electrically separated from each other through one or more separation portions 3161, 3162, 3163, 3164, and 3165 and/or 3261, 3262, 3263, 3264, and 3265 formed of polymer. In this case, the one or more conductive portion 316a, 316b, 316c, and 316d and/or 326a, 326b, 326c, and 326d may be electrically connected to a wireless communication circuit (e.g., the communication module 190 in FIG. 1) included in the electronic device 300 and may be used as an antenna operating in at least one specified band (e.g., about 400 MHz to about 6 GHz).

In various embodiments, the electronic device 300 may include a plurality of antenna structures, for example, a first antenna structure (e.g., the first antenna structure 510 in FIG. 5) and a second antenna structure (e.g., the second antenna structure 520 in FIG. 5). The first antenna structure 510 and the second antenna structure 520 may include an array antenna AR including a plurality of conductive patches (e.g., the plurality of conductive patches 731, 733, 735, and 737 in FIG. 7B). In an embodiment, the plurality of conductive patches 731, 733, 735, and 737 may be inserted into a substrate (e.g., the substrate 740 in FIG. 7B) or exposed through a first substrate surface (e.g., the first substrate surface 7401 in FIG. 7B) of the substrate 740. The first antenna structure 510 and the second antenna structure 520 may be configured to operate in a frequency band (e.g., the mmWave band) of about 25 GHz to 45 GHz.

In an embodiment, the first antenna structure 510 may be disposed in the inner space of the electronic device 300 such that the first substrate surface 7401 of the substrate 740 faces at least a portion of the first rear cover 314 of the first housing 310. Because the first substrate surface 7401 of the substrate 740 is disposed to face at least a portion of the first rear cover 314 of the first housing 310, the first antenna structure 510 may form a first electric field (or a beam pattern or a directional beam) in the first direction (e.g., the −z-axis direction).

In an embodiment, the second antenna structure 520 may be disposed in the inner space of the electronic device 300 such that the first substrate surface 7401 of the substrate 740 faces at least a portion of a second side surface (e.g., the second side surface 313b in FIG. 3A) of the first housing 310. Because the first substrate surface 7401 of the substrate 740 is disposed to face at least a portion of the second side surface (e.g., the second side surface 313b in FIG. 3A) of the first housing 310, the second antenna structure 520 may form a second electric field (e.g., or a beam pattern or a directional beam) in a second direction (e.g., the −x-axis direction) perpendicular to the first direction (e.g., the −z-axis direction).

In various embodiments, in the case where the first antenna structure 510 forms the first electric field in the first direction (e.g., the −z-axis direction) and where the second antenna structure 520 forms the second electric field in the second direction (e.g., the −x-axis direction), the first electric field formed by the first antenna structure 510 may be reflected by the first rear cover 314. The reflected first electric field may be scattered by the first rear cover 314 and transmitted to the second antenna structure 520. Accordingly, near-field interference may occur between the first antenna structure 510 and the second antenna structure 520. As the near-field interference occurs between the first antenna structure 510 and the second antenna structure 520, the power density (PD) in a specific space may increase so that a specific absorption rate (SAR) thereof may increase. If the increased SAR exceeds a SAR reference value (e.g., an acceptable value of SAR), a power limit mode to comply with the SAR reference value, for example, a reduction in transmission power of the antenna structures 510 and 520, may be controlled. However, if the transmission power of the antenna structures 510 and 520 is limited in order to comply with the SAR reference value, the radiation performance of the antenna structures 510 and 520 may be lowered.

The electronic device 300 according to various embodiments may include a conductive member 810 (e.g., a periodic structure) for reducing the near-field interference between the first antenna structure 510 and the second antenna structure 520. In an embodiment, the conductive member 810 may be formed between the first antenna structure 510 and the second antenna structure 520 when the first rear cover 314 is viewed from above.

The conductive member 810 according to various embodiments will be described later in detail with reference to FIGS. 9 and 10.

Figure 9:
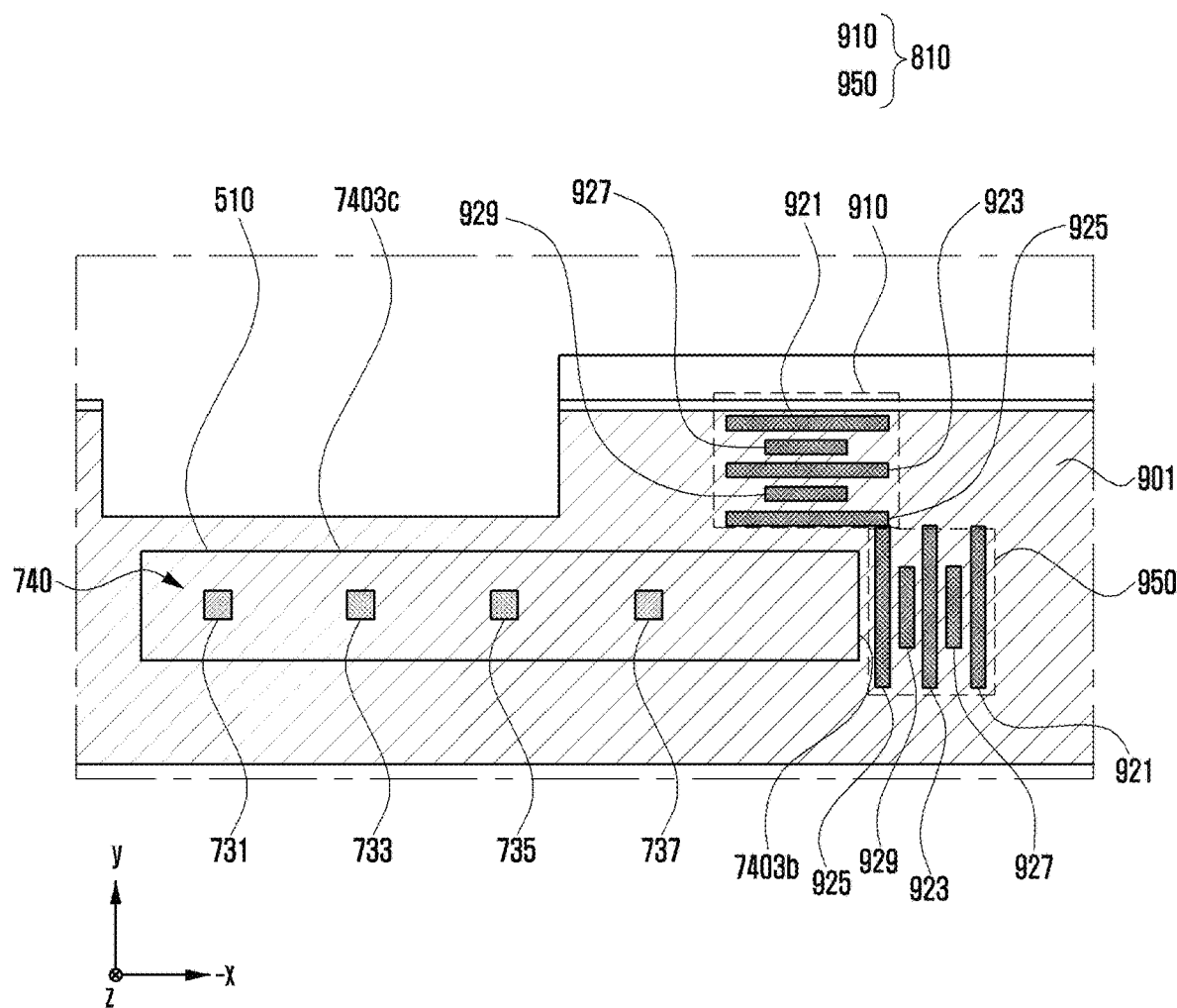
FIG. 9 is a view illustrating a conductive member (e.g., a periodic structure) provided adjacent to a first antenna structure when a first rear cover is viewed from above according to various embodiments.

FIG. 9 is a view illustrating a conductive member 810 (e.g., a periodic structure) provided adjacent to a first antenna structure 510 when a first rear cover 314 is viewed from above according to various embodiments.

Referring to FIG. 9, the first antenna structure 510 may be disposed in the inner space of an electronic device (e.g., the electronic device 300 in FIG. 3A) to form a first electric field (e.g., a first directional beam) in a second direction (e.g., the −z-axis direction) through a first rear cover (e.g., the first rear cover 314 in FIG. 3C). As shown in FIG. 7B and described above, the first antenna structure 510 may include an array antenna AR including a plurality of conductive patches (e.g., the plurality of conductive patches 731, 733, 735, and 737 in FIG. 7B). In an embodiment, the plurality of conductive patches 731, 733, 735, and 737 may be disposed to be exposed through a first substrate surface (e.g., the first substrate surface 7401 in FIG. 7B) of a substrate (e.g., the substrate 740 in FIG. 7B) or inserted into the substrate 740.

In an embodiment, the substrate 740 may include a first substrate surface 7401 facing in a first direction (e.g., the −z-axis direction), a second substrate surface (e.g., the second substrate surface 7402 in FIG. 7B) facing in a second direction (e.g., the z-axis direction) opposite the direction of the first substrate surface 7401, and a substrate side-surface (e.g., the substrate side-surface 7403 in FIG. 7B) surrounding the space between the first substrate surface 7401 and the second substrate surface 7402. The substrate side-surface 7403 may include a first substrate side-surface (e.g., the first substrate side-surface 7403a in FIG. 7B) having a first length, a second substrate side-surface (e.g., the second substrate side-surface 7403b in FIG. 7B) extending perpendicularly from the first substrate side-surface 7403a and having a second length less than the first length, a third substrate side-surface (e.g., the third substrate side-surface 7403c in FIG. 7B) extending parallel to the first substrate side-surface 7403a from the second substrate side-surface 7403b and having the first length, and a fourth substrate side-surface (e.g., the fourth substrate side-surface 7403d in FIG. 7B) extending parallel to the second substrate side-surface 7403b from the third substrate side-surface 7403c and having the second length.

In various embodiments, as shown in FIG. 8 and described above, the electronic device 300 may include a conductive member 810 (e.g., a periodic structure) for reducing near-field interference between the first antenna structure 510 and the second antenna structure 520. In an embodiment, the conductive member 810 may be formed between the first antenna structure 510 and the second antenna structure 520 when the first rear cover 314 is viewed from above.

In various embodiments, because the conductive member 810 is formed between the first antenna structure 510 and the second antenna structure 520 when the first rear cover 314 is viewed from above, it is possible to reduce the near-field interference between the first antenna structure 510 and the second antenna structure 520 without affecting a beam pattern (e.g., an electric field) radiating from the first antenna structure 510 in the first direction (e.g., the −z-axis direction) and a beam pattern (e.g., an electric field) radiating from the second antenna structure 520 in the second direction (e.g., the −x-axis direction) perpendicular to the first direction (e.g., the −z-axis direction).

In various embodiments, the conductive member 810 may be formed on the inner surface of the first rear cover 314. For example, when a graphite sheet 901 is applied to the inner surface of the first rear cover 314, the conductive member 810 may be formed in a portion of the graphite sheet 901. Embodiments are not limited thereto, and the conductive member 810 may be formed of any one of a metal tape, a graphite sheet, a metal sheet, or a conductive ink. For example, the conductive member 810 may be formed by attaching a metal tape to the inner surface of the first rear cover 314. As another example, in the case where the inner surface of the first rear cover 314 is formed of a graphite sheet and a metal sheet, the conductive member 810 may be formed by etching the metal sheet into a pattern. As another example, the conductive member 810 may be formed by printing conductive ink on the inner surface of the first rear cover 314. As another example, the conductive member 810 may be formed by scattering a metal material on the inner surface of the first rear cover 314.

In various embodiments, the conductive member 810 may include a first conductive member 910 and a second conductive member 950.

In an embodiment, the first conductive member 910 may be formed adjacent to the third substrate side-surface 7403c of the first antenna structure 510 (e.g., formed to be spaced a predetermined distance apart from the third substrate side-surface 7403c) when the first rear cover 314 is viewed from above. For example, the first conductive member 910 may be formed in a third direction (e.g., the y-axis direction) perpendicular to the second direction (e.g., the −x-axis direction) from the third substrate side-surface 7403c of the first antenna structure 510.

In an embodiment, the first conductive member 910 may include one or more first conductive lines 921, 923, and 925 having a first length and one or more second conductive lines 927 and 929 having a second length different from the first length. For example, the first length may be greater than the second length.

In an embodiment, the first conductive member 910 may be formed in an irregular shape, such as a dumbbell shape. For example, the first conductive member 910 may include one or more first conductive lines 921, 923, and 925 having a first length and one or more second conductive lines 927 and 929 having a second length different from the first length, which are alternately formed along the third direction (e.g., the y-axis direction).

In an embodiment, the second conductive member 950 may be formed adjacent to the second substrate side-surface 7403b perpendicular to the third substrate side-surface 7403c of the first antenna structure 510 (e.g., formed to be spaced a predetermined distance apart from the second substrate side-surface 7403b) when the first rear cover 314 is viewed from above. For example, the second conductive member 950 may be formed in the second direction (e.g., the −x-axis direction) from the second substrate side-surface 7403b of the first antenna structure 510. In an embodiment, the second substrate side-surface 7403b and the third substrate side-surface 7403c may be two surfaces adjacent to the second antenna structure 520, among four side surfaces (e.g., a first substrate side-surface 7403a, a second substrate side-surface 7403b, a third substrate side-surface 7403c, and a fourth substrate side-surface 7403d) of the substrate 740.

In an embodiment, the second conductive member 950 may have the same pattern as the first conductive member 910. For example, the second conductive member 950 may include one or more first conductive lines 921, 923, and 925 having a first length and one or more second conductive lines 927 and 929 having a second length different from the first length. For example, the first length may be greater than the second length.

In an embodiment, the second conductive member 950 may be formed in an irregular shape, such as a dumbbell shape. For example, the second conductive member 950 may include one or more first conductive lines 921, 923, and 925 having a first length and one or more second conductive lines 927 and 929 having a second length different from the first length, which are alternately formed along the second direction (e.g., the −x-axis direction).

In various embodiments, the first conductive member 910 and the second conductive member 950 may be formed at positions that do not overlap the plurality of conductive patches 731, 733, 735, and 737 included in the first antenna structure 510 and the second antenna structure 520 on the inner surface of the first rear cover 314. For example, the first conductive member 910 may be formed at a position that does not overlap the first antenna structure 510 and the second antenna structure 520 on the inner surface of the first rear cover 314 when the third side surface (e.g., the third side surface 313c in FIG. 3A) of the first side member (e.g., the first side member 313 in FIG. 3A) of the first housing 310 is viewed from the outside. The second conductive member 950 may be formed at a position that does not overlap the first antenna structure 510 and the second antenna structure 520 on the inner surface of the first rear cover 314 when the first side surface (e.g., the first side surface 313a in FIG. 3A)

extending perpendicularly to the third side surface 313*c* of the first side member 313 of the first housing 310 is viewed from the outside.

Although it has been described in FIG. 9 according to various embodiments that the conductive members 910 and 950 include three first conductive lines 921, 923, and 925 and two second conductive lines 927 and 929, embodiments are not limited thereto, and different numbers of first and second conductive lines may be provided in the first and second conductive members 910 and 950.

Figure 10:
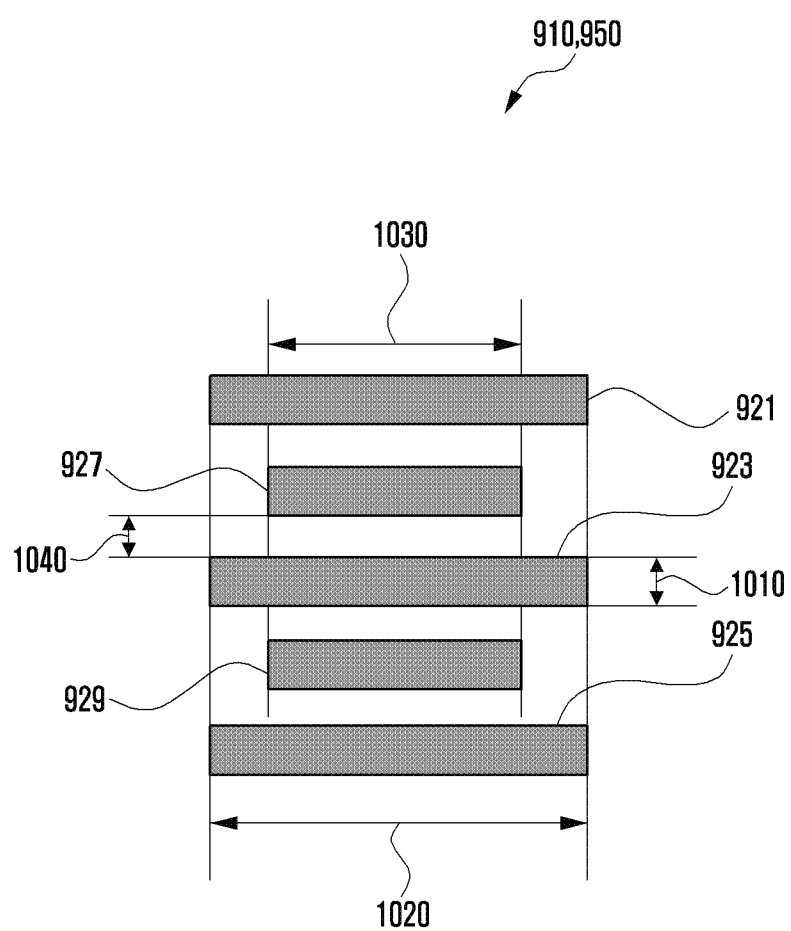
FIG. 10 is a diagram illustrating a conductive member (e.g., a periodic structure) according to various embodiments.

FIG. 10 is a diagram illustrating a conductive member (e.g., a periodic structure) 910 or 950 according to various embodiments.

Referring to FIG. 10, as described with reference to FIG. 9, the conductive member (e.g., the first conductive member 910 or the second conductive member 950) may be formed in the space between a first antenna structure (e.g., the antenna structure 510 in FIG. 5) and a second antenna structure (e.g., the second antenna structure 520 in FIG. 5) when a first rear cover (e.g., the first rear cover 314 in FIG. 3C) is viewed from above. For example, when the first rear cover 314 is viewed from above, the first conductive member 910 may be formed adjacent to the third substrate side-surface 7403*c* of the first antenna structure 510, and the second conductive member 950 may be formed adjacent to the second substrate side-surface 7403*b* of the first antenna structure 510.

In an embodiment, the conductive member 910 or 950 may include one or more first conductive lines 921, 923, and 925 having a first length 1020 and one or more second conductive lines 927 and 929 having a second length 1030 less than the first length 1020, which are alternately formed.

In an embodiment, the first length 1020 of the one or more first conductive lines 921, 923, and 925 may be a length corresponding to ½ of the wavelength λ of a first frequency band. The first frequency band may include a band of about 28 GHz. For example, the first length 1020 corresponding to ½ of the wavelength λ of the first frequency band may be about 5 to 6 mm. However, the first length is not limited thereto.

In an embodiment, the second length 1030 of the one or more second conductive lines 927 and 929 may be a length corresponding to ½ of the wavelength λ of a second frequency band. The second frequency band may include a band of about 39 GHz. The second length 1030 corresponding to ½ of the wavelength λ of the second frequency band may be about 3 to 4 mm. However, the second length is not limited thereto.

Although it has been described in various embodiments that the first length 1020 of the one or more first conductive lines 921, 923, and 925 and the second length 1030 of the one or more second conductive lines 927 and 929 are ½ of the wavelengths λ of the first and second frequency bands, respectively, embodiments are not limited thereto. In another embodiment, the length of the at least one first conductive line 921, 923, or 925 may be determined such that the perimeter of the at least one first conductive line 921, 923, or 925 corresponds to a specified multiple (e.g., about 0.1 to 1 times) of the wavelength λ of a first frequency band (e.g., about 28-GHz band). The length of the at least one second conductive line 927 or 929 may be determined such that the perimeter of the at least one second conductive line 927 or 929 corresponds to a specified multiple (e.g., about 0.1 to 1 times) of the wavelength λ of a second frequency band (e.g., about 39 GHz band).

In various embodiments, the at least one first conductive line 921, 923, or 925 having the first length 1020 and the at least one second conductive line 927 or 929 having the second length 1030 different from the first length 1020 may be formed to have the same width 1010 (e.g., 0.4 mm). The at least one first conductive line 921, 923, or 925 having the first length 1020 and the at least one second conductive line 927 or 929 having the second length 1030 different from the first length 1020 may be alternately formed at a predetermined interval 1040 (e.g., about 0.4 mm).

In various embodiments, the number of the one or more first conductive lines having the first length 1020 may exceed the number of the one or more second conductive lines having the second length 1030. For example, the first length 1020 of the at least one first conductive line 921, 923, or 925 may correspond to ½ of the wavelength λ of the first frequency band (e.g., about 28 GHz band). The second length 1030 of the at least one second conductive line 927 or 929 may correspond to ½ of the wavelength λ of the second frequency band (e.g., about 39 GHz band). Near-field coupling may occur more in the first frequency band (e.g., about 28 GHz band) that is a lower frequency band among the first frequency band (e.g., about 28 GHz band) and the second frequency band (e.g., about 39 GHz band). Because near-field coupling may occur more in the first frequency band (e.g., about 28 GHz band), which is a lower frequency band, in order to block the same, the at least one first conductive line having a length corresponding to ½ of the wavelength λ of the first frequency band (e.g., about 28 GHz band) may be formed such that the number of the first conductive lines exceeds the number of the one or more second conductive lines having the second length 1030. Embodiments are not limited thereto, the number of the one or more first conductive lines having the first length 1020 may be the same as the number of the one or more second conductive lines having the second length 1030.

The sizes of the at least one first conductive line 921, 923, or 925 and the at least one second conductive line 927 or 929, the separation distance between the conductive lines, and/or the positions where the conductive lines are disposed, which have been described above, are provided as examples, and embodiments are not limited to the above-described sizes, separation distance, and/or positions. For example, the sizes, separation distance, and/or positions of the at least one first conductive line 921, 923, or 925 and at least one second conductive line 927 or 929 formed between the respective antenna structures 510 and 520 to increase the radiation efficiency of the antenna structure 510 and 520 may vary.

In various embodiments, Table 1 below shows a near-field result between a comparative example and an embodiment of the disclosure. As can be seen, near-field interference between the first antenna structure 510 and the second antenna structure 520 may be reduced by disposing the conductive member 810 on the inner surface of the first rear cover 314 according to an embodiment of the disclosure, thereby reducing the reduction in transmission power (i.e., allowing for increased transmission power) of antenna structures 510 and 520. Accordingly, the radiation performance of the first antenna structure 510 may be improved by about 0.9 dB, and the radiation performance of the second antenna structure 520 may be improved by about 0.3 dB.

TABLE 1

|  |  | First antenna structure | Second antenna structure |
|---|---|---|---|
| Comparative example | linear | 0.7762 | 0.7079 |
|  | dB | −1.10 | −1.50 |
| Embodiment of disclosure | linear | 0.83 | 0.87 |
|  | dB | −0.80 | −0.60 |
| Comparison result |  | 0.3 dB improved | 0.9 dB improved |

In various embodiments, Table 2 below shows a far-field result between a comparative example and an embodiment of the disclosure, and it can be seen that the radiation performance is equivalent within about 0.3 dB in the first frequency band (e.g., about 28 GHz band) and the second frequency band (e.g., about 39 GHz band) between a comparative example and an embodiment of the disclosure in which the conductive member 810 is disposed on the inner surface of the first rear cover 314. In other words, in the case where the conductive member 810 is disposed on the inner surface of the first rear cover 314 according to the disclosure, it is possible to reduce the near-field interference between the first antenna structure 510 and the second antenna structure 520 without affecting the far-field of the first antenna structure 510 and the second antenna structure 520.

TABLE 2

|  |  | First frequency band (e.g., about 28 GHz band) | Second frequency band (e.g., about 39 GHz band) |
|---|---|---|---|
| Comparative example | CDF (cumulative distribution function) 20 | 16.2 dB | 14.6 dB |
|  | CDF50 | 20.1 dB | 18.8 dB |
|  | peak | 27.6 dB | 25.4 dB |
| Embodiment of disclosure | CDF20 | 16.3 dB | 14.7 dB |
|  | CDF50 | 20.4 dB | 19.1 dB |
|  | peak | 27.7 dB | 24.8 dB |

Figure 11:
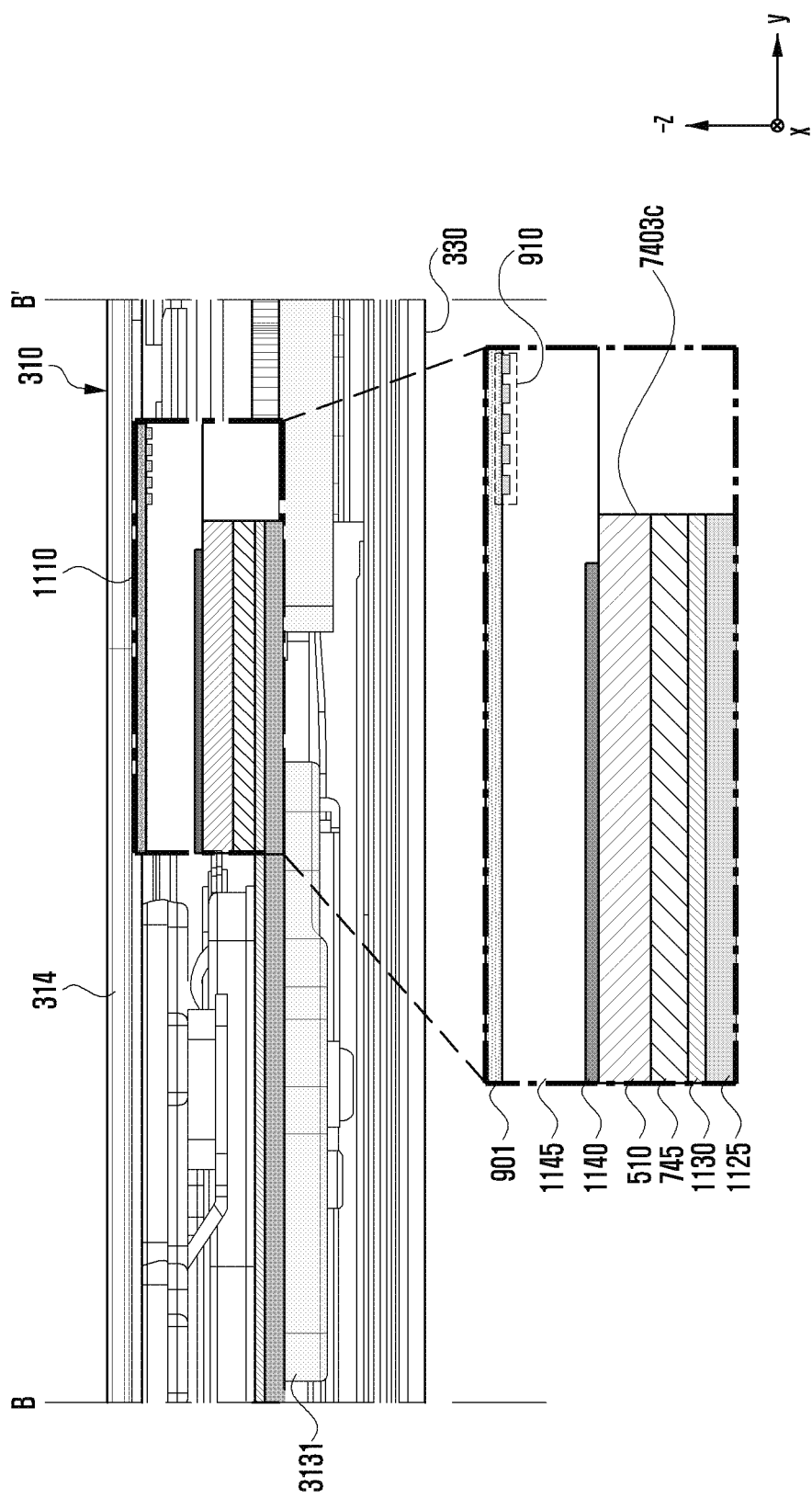
FIG. 11 is a partial cross-sectional view of an electronic device taken along line B-B' in FIG. 8 according to various embodiments.

FIG. 11 is a partial-cross-sectional view of an electronic device 300 taken along line B-B' in FIG. 8 according to various embodiments.

Reference numeral 1110 in FIG. 11 according to various embodiments indicates a stacked structure of an electronic device (e.g., the electronic device 300 in FIG. 3A).

Referring to FIG. 11, the electronic device 300 may include a first housing (e.g., the first housing 310 in FIG. 3A) including a first support member (e.g., the first support member 3131 in FIG. 4C) facing in a first direction (e.g., the z-axis direction) and a first rear cover (e.g., the first rear cover 314 in FIG. 3C) facing in a second direction (e.g., the −z-axis direction) opposite the direction of the first support member 3131.

In an embodiment, the electronic device 300 may include a main printed circuit board (PCB) 1125 (e.g., the first substrate assembly 361 in FIG. 4C) disposed in a space between the first support member 3131 and the first rear cover 314. The electronic device 300 may include a flexible printed circuit board (FPCB) 1130 disposed on the main printed circuit board 1125 (e.g., in the −z-axis direction). The electronic device 300 may include a first antenna structure 510 disposed in a space between the flexible printed circuit board 1130 and the first rear cover 314. The first antenna structure 510 may include a plurality of conductive patches 1140 (e.g., the plurality of conductive patches 731, 733, 735, and 737 in FIG. 7B) inserted into a substrate (e.g., the substrate 740 in FIG. 7B) of the first antenna structure 510 so as to be exposed through a first substrate surface (e.g., the first substrate surface 7401 in FIG. 7B) of the substrate 740. A protective member 745 for protecting various components (e.g., an RFIC (e.g., the RFIC 652 in FIG. 6A) and/or a PMIC (e.g., the PMIC 654 in FIG. 6A)) on the first antenna structure 510 may be provided under the first antenna structure 510 (e.g., in the z-axis direction). A graphite sheet 901 may be applied to the inner surface of the first rear cover 314. A gap 1145 may be formed between the plurality of conductive patches 1140 and the first rear cover 314.

In an embodiment, a conductive member (e.g., the conductive member 810 in FIG. 8) may be formed on the inner surface of the first rear cover 314. For example, the conductive member denoted by reference numeral 1110 represents the first conductive member (e.g., the first conductive member 910 in FIG. 9) taken along line B-B' in FIG. 3C. For example, the first conductive member 910 may be formed to face in the first direction (e.g., the y-axis direction) from the third substrate side-surface 7403c of the first antenna structure 510.

In an embodiment, the conductive member 810 may be formed on the inner surface of the first rear cover 314. For example, in the case where a graphite sheet 901 is applied to the inner surface of the first rear cover 314, the conductive member 810 may be formed in a portion of the graphite sheet 901. Embodiments are not limited thereto, and the conductive member 810 may be formed of any one of a metal tape, a graphite sheet, a metal sheet, or a conductive ink. For example, the conductive member 810 may be formed by attaching a metal tape (e.g., a patch including a conductive member) to the inner surface of the first rear cover 314. As another example, in the case where the inner surface of the first rear cover 314 is formed of a graphite sheet and a metal sheet, the conductive member 810 may be formed by etching the metal sheet into a pattern. As another example, the conductive member 810 may be formed by printing conductive ink on the inner surface of the first rear cover 314. As another example, the conductive member 810 may be formed by scattering a metal material on the inner surface of the first rear cover 314.

In an embodiment, the first conductive member 910 may be formed at a position that does not overlap the first antenna structure 510 and the second antenna structure 520 on the inner surface of the first rear cover 314 when the third side surface (e.g., the third side surface 313c in FIG. 3A) of the first side member (e.g., the first side member 313 in FIG. 3A) of the first housing 310 is viewed from the outside. For example, the first conductive member 910 may be formed at a position that does not overlap the first antenna structure 510 and the second antenna structure 520 in the upper portion (e.g., the −z-axis direction) of first antenna structure 510. The second conductive member 950 may be formed at a position that does not overlap the first antenna structure 510 and the second antenna structure 520 on the inner surface of the first rear cover 314 when the first side surface (e.g., the first side surface 313a in FIG. 3A) extending perpendicularly to the third side surface 313c of the first side member 313 of the first housing 310 is viewed from the outside.

Figure 12:
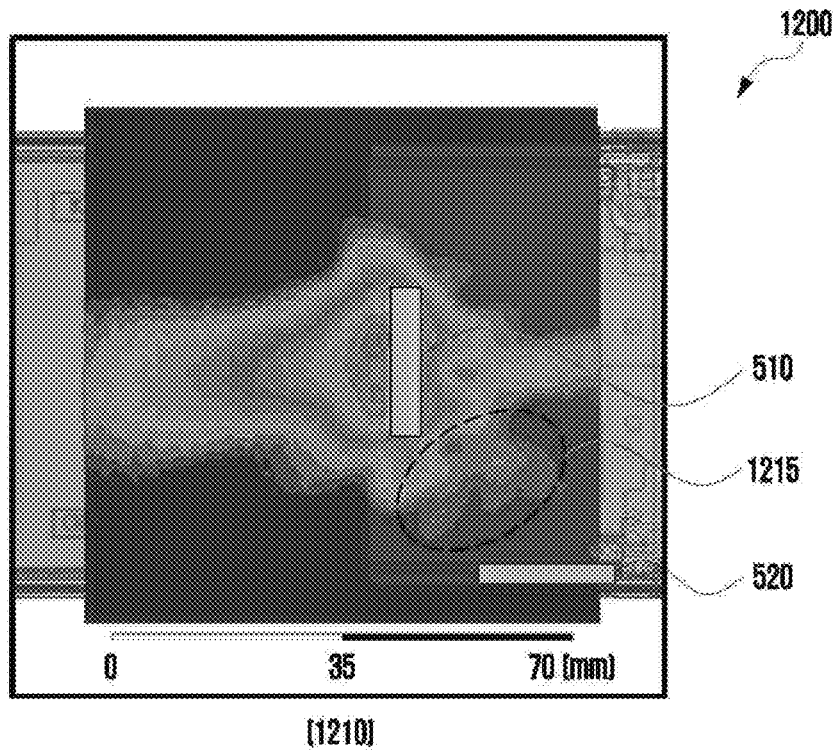
FIG. 12 is a diagram comparing radiation patterns according to whether or not a conductive member is formed on an inner surface of a first rear cover corresponding to a space between antenna structures according to various embodiments.
Figure 12:
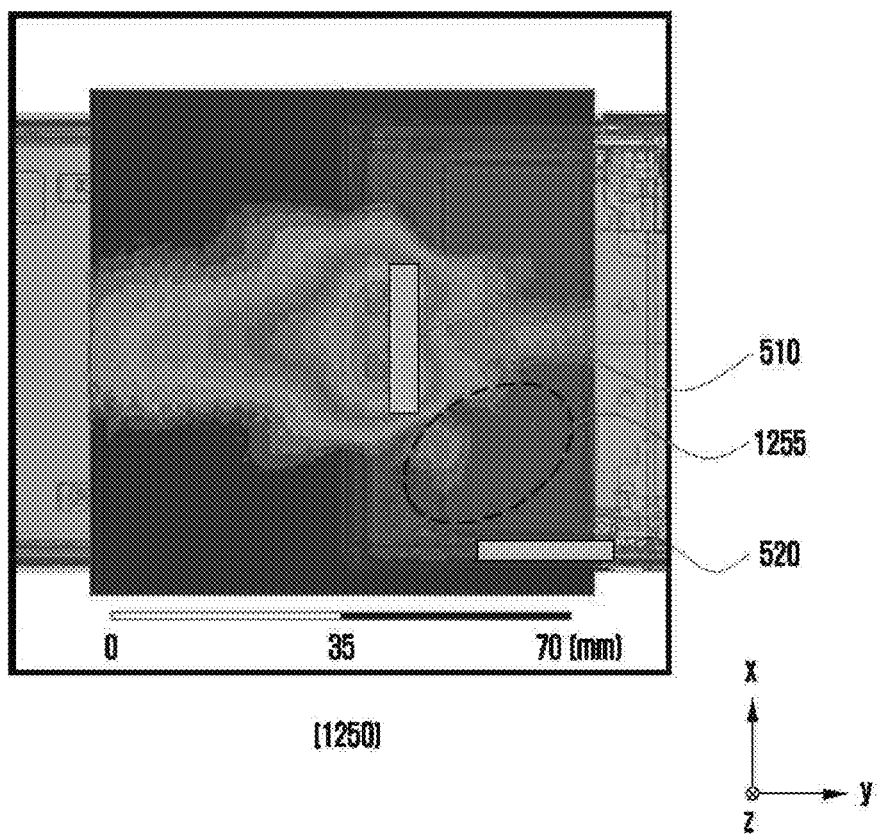

FIG. 12 is a diagram 1200 illustrating radiation patterns according to whether or not a conductive member 910 or 950 is formed on an inner surface of a first rear cover 314 corresponding to a space between antenna structures 510 and 520 according to various embodiments.

Diagram 1210 in FIG. 12 is a diagram showing a radiation pattern of an electronic device in which conductive members (e.g., the first conductive member 910 and the second conductive member 950) are not formed on the inner surface of a first rear cover 314 corresponding to a space between antenna structures (e.g., the first antenna structure 510 and the second antenna structure 520), and diagram 1250 is a diagram showing a radiation pattern of an electronic device in which conductive members 910 and 950 are formed on the inner surface of the first rear cover 314 corresponding to the space between the antenna structures 510 and 520.

Referring to FIG. 12, in the case where the conductive members 910 and 950 are not formed on the inner surface of the first rear cover 314 corresponding to the space between the antenna structures 510 and 520 (e.g., as shown in the diagram 1210), a beam pattern (e.g., an electric field) radiating from the first antenna structure 510 in a first direction (e.g., the −z-axis direction) and a beam pattern (e.g., an electric field) radiating from the second antenna structure 520 in a second direction (e.g., the −x-axis direction) perpendicular to the first direction (e.g., the −z-axis direction) may be affected (e.g., the region 1215), but in the case where the conductive members 910 and 950 are formed on the inner surface of the first rear cover 314 corresponding to the space between the antenna structures 510 and 520 (e.g., as shown in the diagram 1250), a beam pattern (e.g., an electric field) radiating from the first antenna structure 510 in the first direction (e.g., the −z-axis direction) and a beam pattern (e.g., an electric field) radiating from the second antenna structure 520 in the second direction (e.g., the −x-axis direction) perpendicular to the first direction (e.g., the −z-axis direction) may not be affected (e.g., the region 1255).

In FIGS. 5 to 12 according to various embodiments, when the first rear cover 314 is viewed from above, conductive members (e.g., the first conductive member 910 and the second conductive member 950) may be formed on the inner surface of the first rear cover 314 corresponding to the space between the antenna structures (e.g., the first antenna structure 510 and the second antenna structure 520), thereby reducing near-field interference between the first antenna structure 510 and the second antenna structure 520 without affecting a beam pattern (e.g., an electric field) radiating from the first antenna structure 510 in the first direction (e.g., the −z-axis direction) and a beam pattern (e.g., an electric field) radiating from the second antenna structure 520 in the second direction (e.g., the −x-axis direction) perpendicular to the first direction (e.g., the −z-axis direction). In an embodiment, as the near-field interference between the antenna structures 510 and 520 is reduced by the conductive members 910 and 950, the reduction in transmission power of the antenna structures 510 and 520 may also be reduced, thereby improving the radiation performance of the antenna structures 510 and 520.

An electronic device (e.g., the electronic device 300 in FIG. 3A) according to various embodiments may include a first housing (e.g., the first housing 310 in FIG. 3A) including a first support member (e.g., the first support member 3131 in FIG. 4C) facing in a first direction (e.g., the z-axis direction), a first rear cover (e.g., the first rear cover 314 in FIG. 3C) facing in a second direction (e.g., the −z-axis direction) opposite the direction of the first support member 3131, and a first side member (e.g., the first side member 313 in FIG. 3A) surrounding a space between the first support member 3131 and the first rear cover 314, a second housing (e.g., the second housing 320 in FIG. 3A) connected to the first housing 310 so to be folded about a folding axis (the axis A) using a hinge structure (e.g., the hinge structure 340 in FIG. 3B) and including a second support member (e.g., the second support member 3231 in FIG. 4) facing in the first direction (e.g., the z-axis direction), a second rear cover (e.g., the second rear cover 324 in FIG. 3C) facing in the second direction (e.g., the −z-axis direction) opposite the direction of the second support member 3231, and a second side member (e.g., the second side member in FIG. 3A) surrounding a space between the second support member 3231 and the second rear cover 324, a first antenna structure 510 disposed in a space between the first support member 3131 and the first rear cover 314 to form a first electric field in the second direction (e.g., the −z-axis direction) so as to pass through the first rear cover 314, a second antenna structure 520 disposed near the first antenna structure 510 in a space between the first support member 3131 and the first rear cover 314 to form a second electric field in a third direction (e.g., the −x-axis direction) perpendicular to the second direction (e.g., the −z-axis direction) such that the second electric field may pass through the first side member 313, and a conductive member (e.g., the conductive member 810 in FIG. 8) disposed between the first antenna structure 510 and the second antenna structure 520.

In various embodiments, the conductive member 810 may be formed on an inner surface of the first rear cover 314.

In various embodiments, the conductive member 810 may include a first conductive member (e.g., the first conductive member 910 in FIG. 9) and a second conductive member (e.g., the second conductive member 950 in FIG. 9).

In various embodiments, the first conductive member 910 may be formed near a first side surface (e.g., the third substrate side-surface 7403c in FIG. 9) of the first antenna structure 510 to face in a fourth direction (e.g., the y-axis direction) perpendicular to the third direction (e.g., the −x-axis direction) when the first rear cover 314 is viewed from above, and the second conductive member 950 may be formed near a second side surface (e.g., the second substrate side-surface 7403b in FIG. 9) perpendicular to the first side surface (e.g., the third substrate side-surface 7403c in FIG. 9) of the first antenna structure 510 to face in the third direction (e.g., the −x-axis direction) when the first rear cover 314 is viewed from above.

In various embodiments, the first conductive member 910 may be formed at a position that does not overlap the first antenna structure 510 and the second antenna structure 520 when a first side surface (e.g., the third side surface 313c in FIG. 3A) of the first side member 313 is viewed from the outside, and the second conductive member 950 may be formed at a position that does not overlap the first antenna structure 510 and the second antenna structure 520 when a second side surface (e.g., the first side surface 313a in FIG. 3A) extending vertically from the first side surface (e.g., the third side surface 313c in FIG. 3A) of the first side member 313 is viewed from the outside.

In various embodiments, the first conductive member 910 may include at least one first conductive line (e.g., the first conductive line 921, 923, or 925 in FIG. 9) having a first length and at least one second conductive line (e.g., the second conductive line 927 or 929 in FIG. 9) having a second length, and the first length may be different from the second length.

In various embodiments, the at least one first conductive line 921, 923, or 925 having the first length and the at least one second conductive line 927 or 929 having the second length may have the same width.

In various embodiments, the first conductive member 910 may be configured such that the at least one first conductive line 921, 923, or 925 having the first length and the at least one second conductive line 927 or 929 having the second length are alternately formed at a predetermined interval.

In various embodiments, the second conductive member 950 may include at least one first conductive line (e.g., the first conductive line 921, 923, or 925 in FIG. 9) having a first length and at least one second conductive line (e.g., the second conductive line 927 or 929 in FIG. 9) having a second length, and the first length may be different from the second length.

In various embodiments, each of the at least one first conductive lines 921, 923, and 925, as well as each of the at least one second conductive lines 927 and 929 may have the same width.

In various embodiments, the second conductive member 950 may be configured such that the at least one first conductive line 921, 923, or 925 having the first length and the at least one second conductive line 927 or 929 having the second length are alternately formed at a predetermined interval.

In various embodiments, the first length may correspond to ½ of the wavelength λ of a first frequency band, and the second length may correspond to ½ of the wavelength λ of a second frequency band.

In various embodiments, the first frequency band may include a band of about 28 GHz, and the second frequency band may include a band of about 39 GHz.

In various embodiments, the number of the at least one first conductive line 921, 923, or 925 having the first length may be equal to or greater than the number of the at least one second conductive line 927 or 929 having the second length.

In various embodiments, the first length may be configured such that the perimeter of the at least one first conductive line 921, 923, or 925 corresponds to a specified multiple of the wavelength λ of a first frequency band, and the second length may be configured such that the perimeter of the at least one second conductive line 927 or 929 corresponds to a specified multiple of the wavelength λ of a second frequency band.

In various embodiments, the conductive member 810 may be formed of any one of a metal tape, a graphite sheet, a metal sheet, a conductive ink, or a metal material.

In various embodiments, the conductive member 810 may be formed by attaching the metal tape to the inner surface of the first rear cover 314, by etching the metal sheet into a pattern in the case where the inner surface of the first rear cover 314 is formed of the graphite sheet and the metal sheet, by printing the conductive ink on the inner surface of the first rear cover 314, or by scattering the metal material on the inner surface of the rear cover 314.

In various embodiments, the first antenna structure 510 and the second antenna structure 520 may include a plurality of conductive patches (e.g., the plurality of conductive patches 731, 733, 735, and 737 in FIG. 7B) disposed on a substrate (e.g., the substrate 740 in FIG. 7B).

In various embodiments, the first antenna structure 510 may be configured such that a first substrate surface (e.g., the first substrate surface 7401 in FIG. 7B) of the substrate 740 through which the plurality of conductive patches 731, 733, 735, and 737 is exposed faces at least a portion of the first rear cover 314, and may thereby form the first electric field in the second direction (e.g., the −z-axis direction) so as to pass through the first rear cover 314.

In various embodiments, the second antenna structure 520 may be configured such that a first substrate surface 7401 of the substrate 740 through which the plurality of conductive patches 731, 733, 735, and 737 is exposed faces one side surface (e.g., the second side surface 131*b* in FIG. 3A) of the first housing 310, and may thereby form the second electric field in the third direction (e.g., the −x-axis direction), which may pass through the first side member 313.

In accordance with an aspect of the disclosure, an electronic device includes: a display configured to emit light in a first direction; a rear cover facing a second direction opposite the first direction; a side structure that extends from the display to the rear cover; a first antenna structure provided between the rear cover and the display, and configured to form a first electric field in the second direction; a second antenna structure between the rear cover and the display, and configured to form a second electric field in a third direction perpendicular to the first direction; and a conductive structure provided between the first antenna structure and the second antenna structure.

The first antenna structure may include a plurality of first conductive patches arranged along the third direction, and the second antenna structure may include a plurality of second conductive patches arranged along a fourth direction perpendicular to the first direction and the third direction.

The conductive structure may include a first conductive structure and a second conductive structure. The first conductive structure may include: a plurality of first conductive lines having a first length along the fourth direction; and a plurality of second conductive lines having a second length along the fourth direction, and alternatively provided with the plurality of first conductive lines. The second conductive structure may include: a plurality of third conductive lines having a third length along the third direction; and a plurality of fourth conductive lines having a fourth length along the third direction, and alternatively provided with the plurality of third conductive lines.

The first length may be different from the second length, the first length may correspond to the third length, and the second length may correspond to the fourth length.

The first length may correspond to ½ of a first wavelength (λ) of a first frequency band, and the second length may correspond to ½ of a second wavelength (λ) of a second frequency band.

The side structure may include a plurality of conductive portions and a plurality of insulating portions between the plurality of conductive portions, and the plurality of conductive portions may form a third antenna structure configured to operate in a third frequency band that is lower than the first frequency band and the second frequency band.

In accordance with an aspect of the disclosure, a method of controlling an electronic device including a display configured to emit light in a first direction; a rear cover facing a second direction opposite the first direction; a side structure that extends from the display to the rear cover; a first antenna structure and a second antenna structure provided between the rear cover and the display; and a conductive structure provided between the first antenna structure and the second antenna structure, is provided. The method includes: controlling the display to provide a graphical user interface; controlling the first antenna structure to form a first electric field that is emitted through the rear cover; controlling the second antenna structure to form a second electric field that is emitted through the side structure; and electromagnetically shielding the first electric field from the second electric field using the conductive structure.

While aspects of embodiments have been particularly shown and described, it will be understood that various changes in form and details may be made therein without departing from the spirit and scope of the following claims.

What is claimed is:

1. An electronic device comprising:
a first housing comprising a first support member facing in a first direction, a first rear cover facing in a second direction opposite the first direction, and a first side member surrounding a first space between the first support member and the first rear cover;
a second housing comprising a second support member facing in the first direction, a second rear cover facing in the second direction, and a second side member surrounding a second space between the second support member and the second rear cover;
a hinge structure connected to the first housing and the second housing and configured to be folded about a folding axis;
a first antenna structure disposed in the first space and configured to form a first electric field in the second direction so as to pass through the first rear cover;
a second antenna structure disposed near the first antenna structure in the first space and configured to form a second electric field in a third direction perpendicular to the second direction; and
a conductive member disposed between the first antenna structure and the second antenna structure.

2. The electronic device of claim 1, wherein the conductive member is formed on an inner surface of the first rear cover.

3. The electronic device of claim 2, wherein the conductive member comprises a first conductive member and a second conductive member.

4. The electronic device of claim 3, wherein the first conductive member is formed adjacent a first side surface of the first antenna structure to face in a fourth direction perpendicular to the third direction when the first rear cover is viewed from above, and
wherein the second conductive member is formed adjacent a second side surface perpendicular to the first side surface of the first antenna structure to face in the third direction when the first rear cover is viewed from above.

5. The electronic device of claim 3, wherein the first antenna structure comprises a plurality of first conductive patches provided on a first substrate,
wherein the second antenna structure comprises a plurality of second conductive patches provided on a second substrate,
wherein the first conductive member is formed at a position that does not overlap the plurality of first conductive patches of the first antenna structure and the plurality of second conductive patches of the second antenna structure along a fourth direction perpendicular to the first direction and the third direction, and
wherein the second conductive member is formed at a position that does not overlap the plurality of first conductive patches of the first antenna structure and the plurality of second conductive patches of the second antenna structure along the third direction.

6. The electronic device of claim 3, wherein the first conductive member comprises at least one first conductive line having a first length and at least one second conductive line having a second length, and
wherein the first length is different from the second length.

7. The electronic device of claim 6, wherein the at least one first conductive line and the at least one second conductive line have the same width, and
wherein the first conductive member is configured such that the at least one first conductive line and the at least one second conductive line are alternately formed at a predetermined interval.

8. The electronic device of claim 6, wherein the first length corresponds to ½ of a wavelength (λ) of a first frequency band, and
wherein the second length corresponds to ½ of a wavelength (λ) of a second frequency band.

9. The electronic device of claim 6, wherein a first perimeter of the at least one first conductive line corresponds to a multiple of a first wavelength (λ) of a first frequency band, and
wherein a second perimeter of the at least one second conductive line corresponds to a multiple of a second wavelength (λ) of a second frequency band.

10. The electronic device of claim 6, wherein the second conductive member comprises at least one third conductive line having a third length and at least one fourth conductive line having a fourth length, and
wherein the third length is different from the fourth length.

11. The electronic device of claim 10, wherein the at least one third conductive line and the at least one fourth conductive line have a common width along the third direction.

12. The electronic device of claim 10, wherein the at least one third conductive line and the at least one fourth conductive line are alternately formed at a predetermined interval.

13. The electronic device of claim 10, wherein the third length corresponds to ½ of a first wavelength (λ) of a first frequency band, and
wherein the fourth length corresponds to ½ of a second wavelength (λ) of a second frequency band.

14. The electronic device of claim 13, wherein the first frequency band comprises 28 GHz, and
wherein the second frequency band comprises 39 GHz.

15. The electronic device of claim 14, wherein a number of the at least one third conductive line is equal to or greater than a number of the at least one fourth conductive line.

16. The electronic device of claim 10, wherein a third perimeter of the at least one third conductive line corresponds to a multiple of a first wavelength (λ) of a first frequency band, and
wherein a fourth perimeter of the at least one fourth conductive line corresponds to a multiple of a wavelength (λ) of a second frequency band.

17. The electronic device of claim 1, wherein the conductive member comprises any one or any combination of a metal tape, a graphite sheet, a metal sheet, a conductive ink, or a metal material, and
wherein the conductive member is formed by attaching the metal tape to an inner surface of the first rear cover, by etching the metal sheet into a pattern, by printing the conductive ink on the inner surface of the first rear cover, or by scattering the metal material on the inner surface of the first rear cover.

18. The electronic device of claim 1, wherein the first antenna structure comprises a plurality of first conductive patches disposed on a first substrate, and
wherein the second antenna structure comprises a plurality of second conductive patches disposed on a second substrate.

19. The electronic device of claim 18, wherein the plurality of first conductive patches faces at least a portion of the first rear cover.

20. The electronic device of claim 19, wherein the plurality of second conductive patches faces one side surface of the first housing.

\* \* \* \* \*